June 30, 1936.  J. W. BRYCE  2,045,977
PUNCHING DEVICE
Filed July 21, 1934  10 Sheets-Sheet 1

June 30, 1936.  J. W. BRYCE  2,045,977
PUNCHING DEVICE
Filed July 21, 1934  10 Sheets-Sheet 2

INVENTOR
james W. Bryce
BY
W. N. Wilson
ATTORNEY

June 30, 1936.    J. W. BRYCE    2,045,977
PUNCHING DEVICE
Filed July 21, 1934    10 Sheets-Sheet 3

June 30, 1936.　　　　J. W. BRYCE　　　　2,045,977
PUNCHING DEVICE
Filed July 21, 1934　　　10 Sheets-Sheet 6

INVENTOR
James W. Bryce
BY
W. M. Wilson
ATTORNEY

June 30, 1936.                J. W. BRYCE                2,045,977
                            PUNCHING DEVICE
                         Filed July 21, 1934        10 Sheets-Sheet 7

INVENTOR
James W. Bryce
BY
ATTORNEY

June 30, 1936. J. W. BRYCE 2,045,977
PUNCHING DEVICE
Filed July 21, 1934 10 Sheets-Sheet 10

TYPE I

TYPE II

TYPE III

TYPE IV

TYPE V

TYPE VI

INVENTOR.
James W. Bryce
BY
ATTORNEYS.

Patented June 30, 1936

2,045,977

UNITED STATES PATENT OFFICE 2,045,977

PUNCHING DEVICE

James W. Bryce, Bloomfield, N. J., assignor to International Business Machines Corporation, New York, N. Y., a corporation of New York Application July 21, 1934, Serial No. 736,278

45 Claims. (Cl. 164—115)

This invention relates to devices for punching record cards such as those used in tabulating machines, particularly devices of the kind that punch one or more reproductions of cards already punched.

In the tabulating art it is frequently necessary to provide one or more reproduced copies of an original card. The ordiginal card is usually punched one perforation at a time by an operator with a key-operated machine but as it would be too slow and expensive a process to punch duplicates of the originals by hand, reproducing and gang punching machines have been designed to produce copies of the original or pattern card in a single operation.

In some forms of accounting it is desirable to have extra data perforated on the punched cards in addition to the data read off the pattern card or cards. For this purpose the machine of the present invention provides manual data set up devices for controlling the punching of selected data in a plurality of gang punched cards. The data are set up in commutators and readings are taken with an impulse emitter which directs controlling impulses into an electrically controlled punch.

Most card controlled punching machines are designed either to punch a single copy of a pattern card or to punch a fixed number of copies of a pattern card, the copy control number usually being set up by the operator of the machine. The machine of the present invention is adapted for universal use in reproducing single copies or gang punching a plurality of copies. A feature is the automatic control of the number of copies to be made by data on the pattern card. In other words, the operator need not set up a number to control the number of copies to be made, because such a control number may be read off the pattern card.

In an alternate method of operation, the copy control number may be carried by a separate number card which is associated with a pattern card in determining the number of cards to be punched and the data to be punched in the cards.

Provision is also made for manually setting up a control number to determine the number of copies to be punched.

My present invention discloses an improved reproducing gang punch of a type especially suited for the above described work, viz, automatically punching an automatically selected number of copies of pattern cards, plus the punching of extra data set up by hand.

In certain kinds of accounting, different classes of cards require different numbers of copies, there being a certain number of copies for each class. The class of a pattern card is denoted by classification number perforations punched therein. The present invention provides means for automatically selecting the number of copies to be punched according to the class of the pattern. A manual set up is made of a plurality of classification numbers and associated therewith are a plurality of related numbers for copy control. The various set up class numbers are compared with the class number cn the pattern and when agreement is found the related copy number is used to control the number of copies punched.

Another way of securing classification control of the number of copies punched is revealed by the present invention. This way involves the use of a separate number card carrying the classification number. Associated with the number card is a pattern card punched with the data to be reproduced. Thus the one card determines the class and the corresponding number of copies required, while the other card determines the data to be punched.

Another object of this invention is the provision of means for adapting accumulators to control reproducing and gang punching operation. A pair of accumulators are provided, one being designed to receive a number representing the number of copies desired, and the other being operated to add a unit for each card punching operation. A comparing means is provided between the two accumulators so that the numbers thereon may be compared to determine when the unit adding accumulator contains a number as large as the number in the adjusted control accumulator. When the numbers in both accumulators coincide it is a sign that the required number of copies have been punched and then punching operation is interrupted until another pattern card is analyzed.

Another object of the invention is the provision of devices for manually setting up a copy control number and comparing such a number with the number accumulated in the unit counting accumulator. In this way a desired number of copies may be made before the punch operation is interrupted.

A feature of the present invention is the automatically and manually settable electrical control devices for determining the number of records to be reproduced or gang punched.

Another object of the invention is to provide means for using the reading of a single set of brushes to selectively control the setting of punches and the adding of a number controlling the number of copies to be punched. When a number card follows a pattern card, connections are automatically switched so that the brushes reading the same portion of both cards are alternately connected to accumulating magnets and punch control magnets.

The foregoing and other objects of the present invention will be apparent as this specification continues with reference to the drawings which form part of the disclosure.

Figure 14:
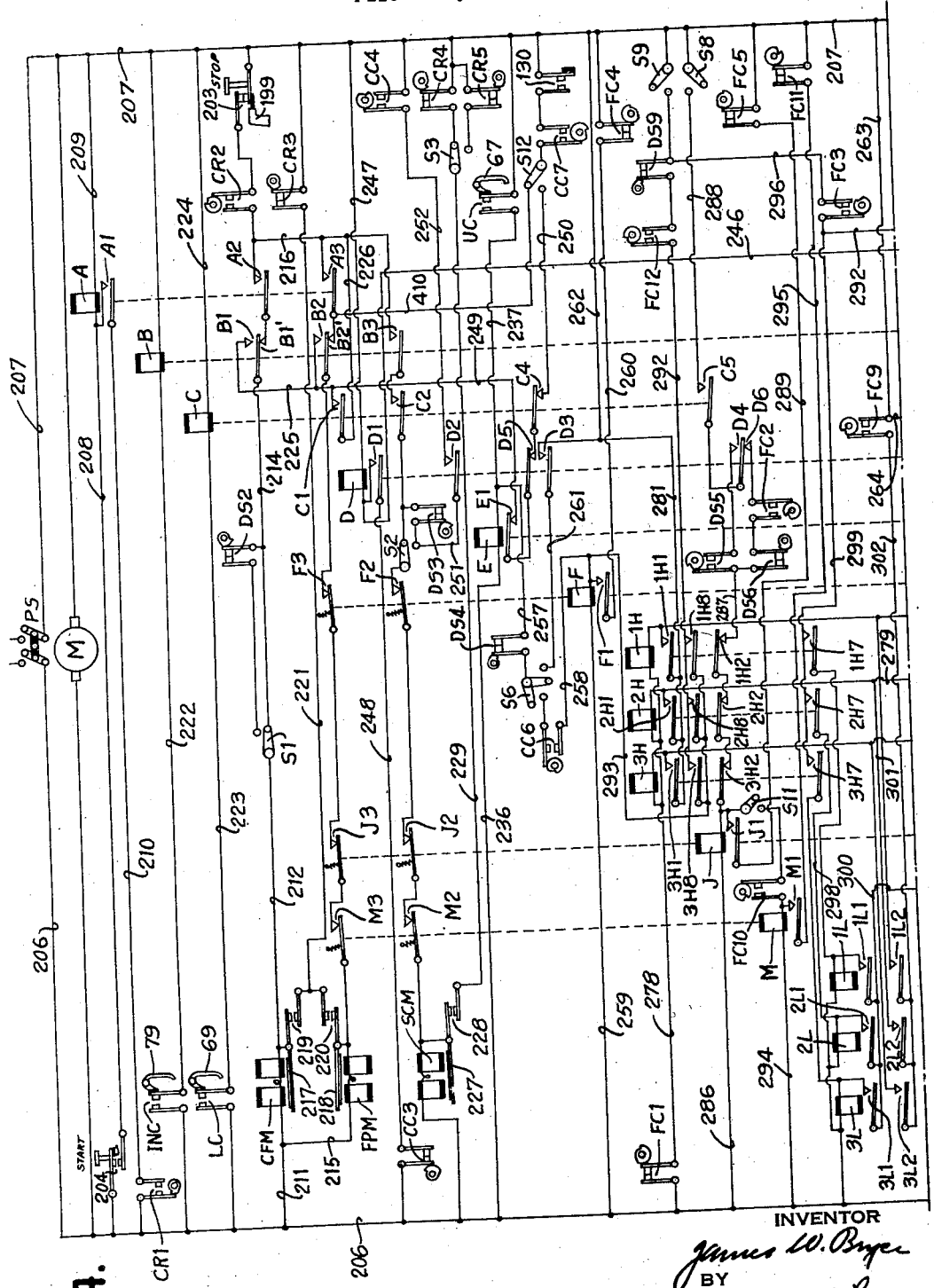

Figs. 14 and 14a form a wiring diagram of the machine.

Figure 15:
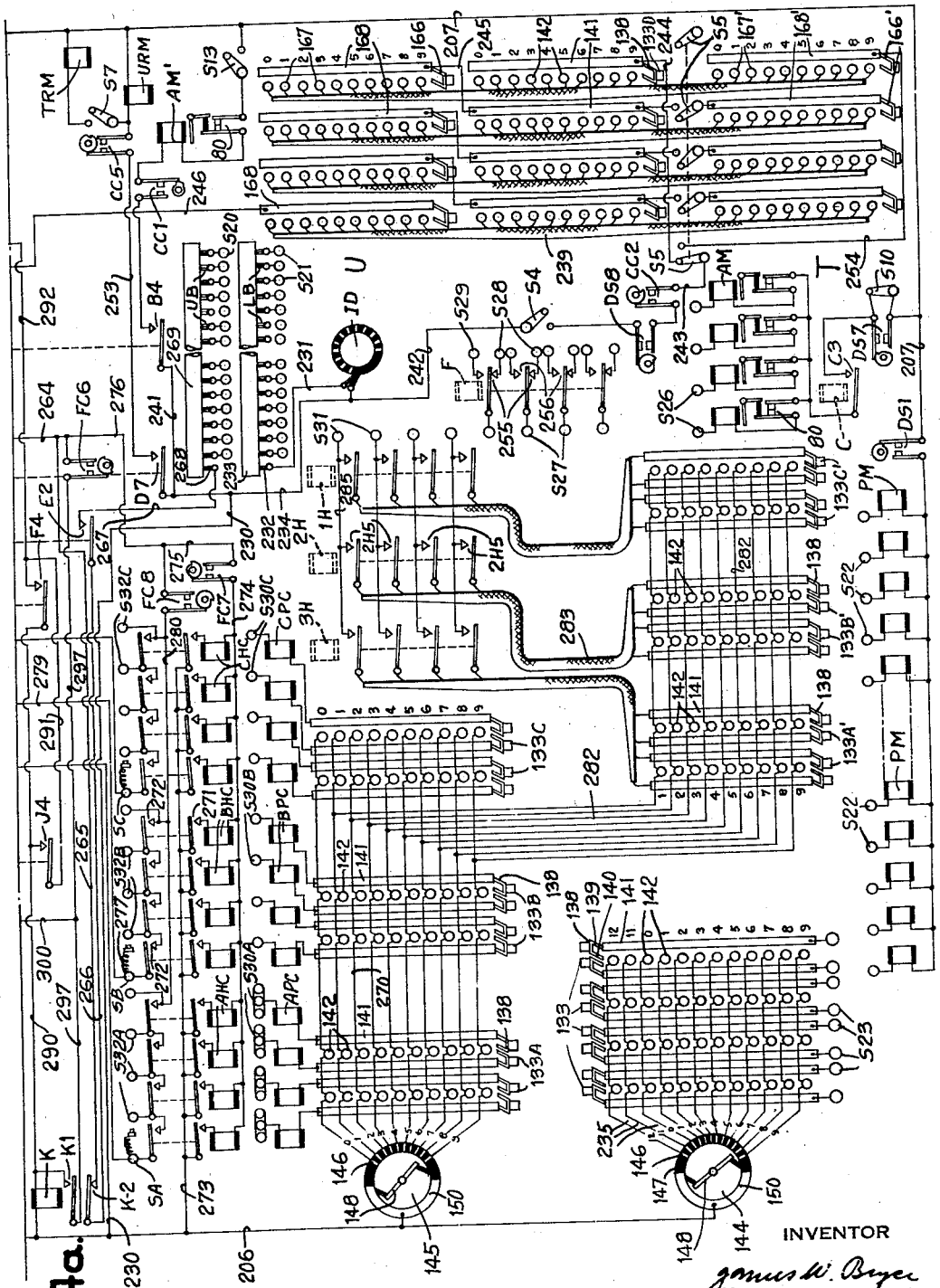

Fig. 15 shows a portion of a perforated pattern card.

Figure 16:
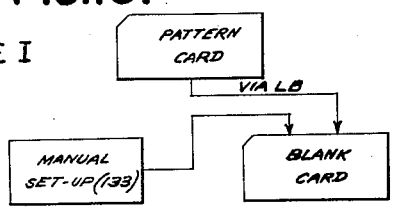

Fig. 16 is a diagrammatic view of the elements used in the type of operation where both the pattern card and the manually adjusted means control the punching of reproduced data.

Figure 17:
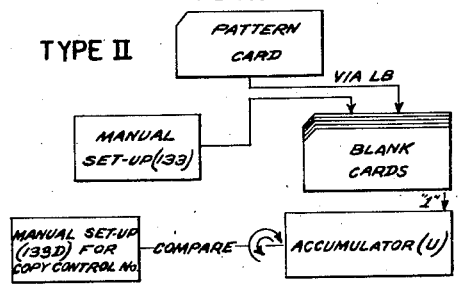

Fig. 17 is a diagrammatic view of the relationship of the gang punching control parts in the type of operation where a number is manually set up and compared with the count of the cards punched so that punching may be stopped after a predetermined number of cards are punched.

Figure 18:
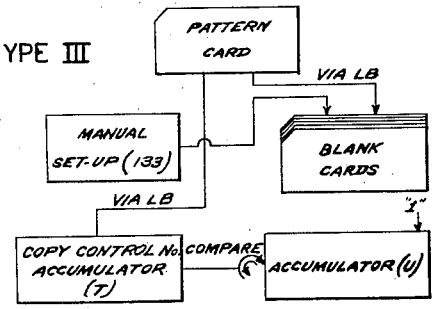

Fig. 18 is a diagrammatic view of the punch control parts as arranged for the type of operation where the pattern card carries the copy control number which is automatically set up and compared with the punching operation count, so that when the control number and the counted number are found similar, punching may be stopped, since then the required number of copies have been made.

Figure 19:
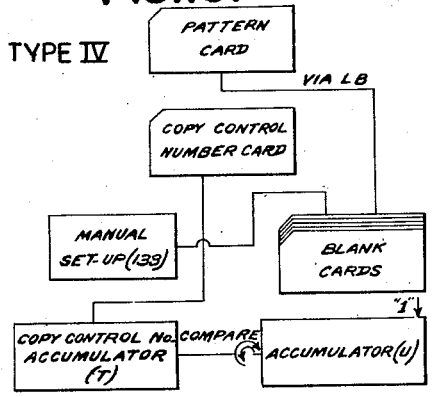

Fig. 19 is a diagrammatic view of the control elements as they function for the type of operation employed when an extra number card is used to carry the copy control number which appeared on the pattern card in the example of Fig. 18.

Figure 20:
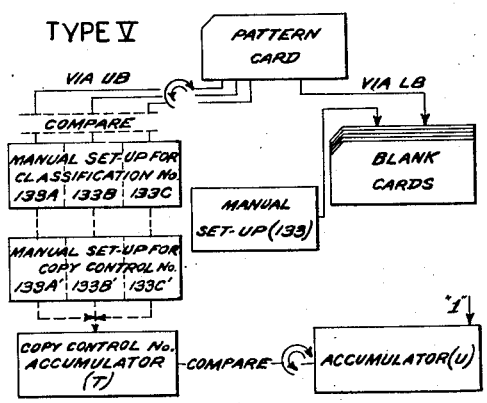

Fig. 20 is a diagrammatic showing of the punch control parts as they are interrelated in the type of punch operation where the pattern card carries one or a plurality of classification numbers which are compared with a plurality of manually set classification numbers. Associated with each of the set classification numbers is a copy control number that is selected when agreement is found between a related classification number and a classification number on the pattern. The selected copy control number is then compared with the number counted as cards are punched so that after the selected number of copies have been produced punching is stopped.

Figure 21:
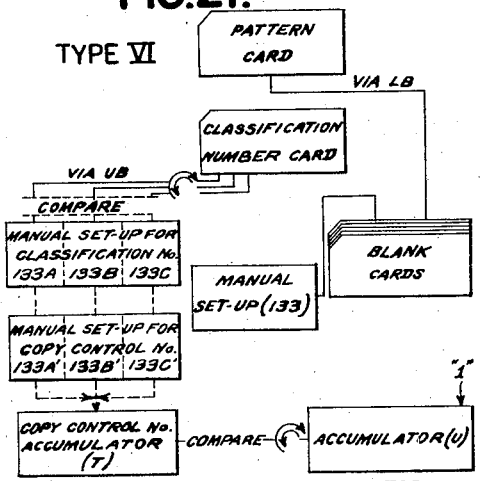

Fig. 21 is a diagrammatic view of the punch control elements as they are arranged for the type of operation used when an extra number card carries the classification numbers which appeared on the pattern card in the example of Fig. 20.

The invention is an improvement on machines of the type shown in my Patent No. 1,791,950 and the Cunningham Patent No. 1,916,966.

The machine comprises in general the analyzing section 20 (Fig. 1), the punching section 21, the manually settable control section 22, the two accumulators T and U, and the plugboard 23.

While a pattern card 25 is passing through section 20 it controls the selection of punches in the punching section 21 which later operate on blank cards fed from magazine 24, as explained hereinafter.

A sample pattern card 25 is shown in Fig. 15. There it is seen that various groups of data may be represented by perforations. The card shown carries three different forms of information. The number 646211 may represent an amount, a name or any other form of accounting data which is to be reproduced on one or more cards.

The number 559 may represent the number of reproductions of copies that are to be made under control of the card 25. The other number 7214 on the card may represent a classification group number and be used to control the selection of a certain number of copies as explained further on in this specification.

Figure 6:
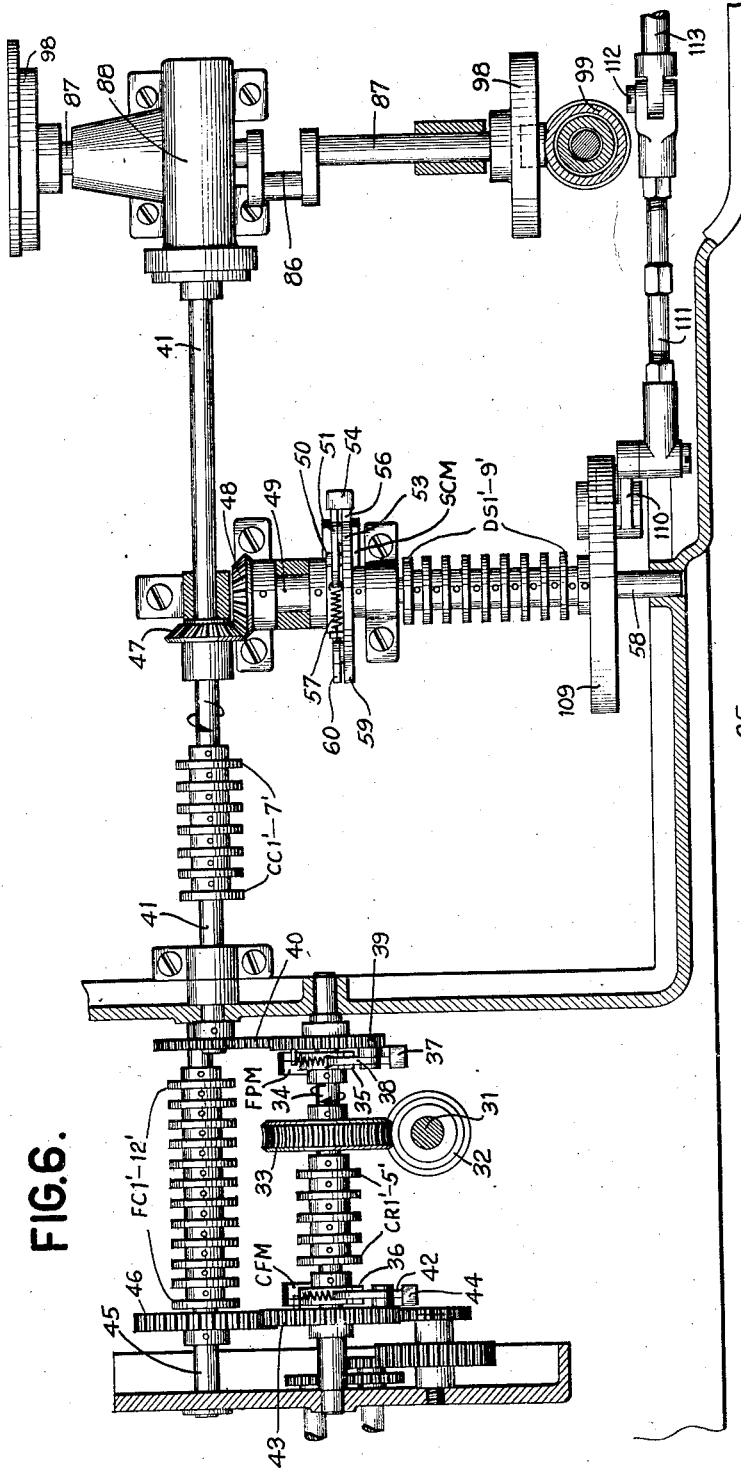
Fig. 6 is a plan view showing the gearing and shafting connections from the drive shaft to the card feeding and punching devices.
Figure 9:
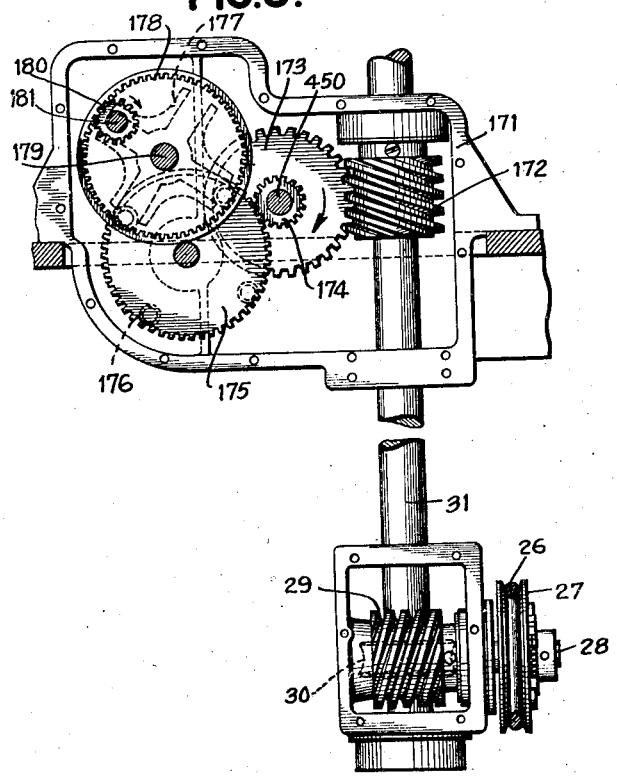
Fig. 9 is a sectional elevation view taken along the line 9—9 of Fig. 1 and showing the resetting mechanism cooperating with the accumulators.

Power for the entire machine is furnished by a motor M (Fig. 1) connected through a belt 26 to pulley 27 on a shaft 28, (see also Fig. 9). On this same shaft is fixed a worm gear 29 which cooperates with a worm wheel 30 fixed on a vertical shaft 31 guided in the horizontal bracing of the machine and carrying a worm gear 32 at the upper end. Referring to Fig. 6 it is noted that gear 32 meshes with a worm wheel 33 fixed to a short shaft 34 carrying a pair of notched disks 35 and 36, one on each end.

The disk 35 forms part of a clutch connection to the punch operating devices. Whenever a punch control magnet FPM is energized, an armature latch 37 is operated to release a pawl 38 pivoted on a gear wheel 39 to allow the pawl to engage in a notch in disk 35, thus forming a connection between the driving shaft 34 and gear 39. Gear 39 meshes with another gear 40 fixed to a shaft 41 which forms the means for driving the blank card feeding and punching devices as explained hereinafter.

The disk 36 at the other end of shaft 34 cooperates with a pawl 42 pivoted on a card feed gear 43. Whenever a card feed clutch magnet CFM is energized, the related armature latch 44 is operated to release the pawl 42 and connect the gear 43 with the driving disk 36, thus forming a driving connection between the main operating means and the pattern card feeding devices.

A series of contact operating cams CR1'—5' are mounted on shaft 34. Since this shaft is in operation continuously the contacts CR1—5 associated with these cams will be operated on every cycle of operation as long as the machine is running.

Another series of cams FC1'—12' is mounted on a shaft 45 carrying a gear 46 in mesh with gear 43. Since gear 43 is turned only when magnet CFM is energized, the contacts FC1—12 associated with cams FC1'—12' will be operated only when pattern cards are being fed.

A third series of cams CC1'—7' are mounted on the card feed and punch operating shaft 41. As pointed out hereinbefore this shaft is operated only when clutch connections are established by energization of magnet PCM. Therefore, the contacts CC1—7 associated with cams CC1'—7' will be operated while blank cards are being fed and punched.

Another clutch is provided between the punch operating shaft 41 and the punch setting means or interposer selectors. Mounted on the driving shaft 41 is a bevel gear 47 cooperating with another bevel gear 48 fixed to a short shaft 49 carrying at its end a notched disk 50.

Figure 5:
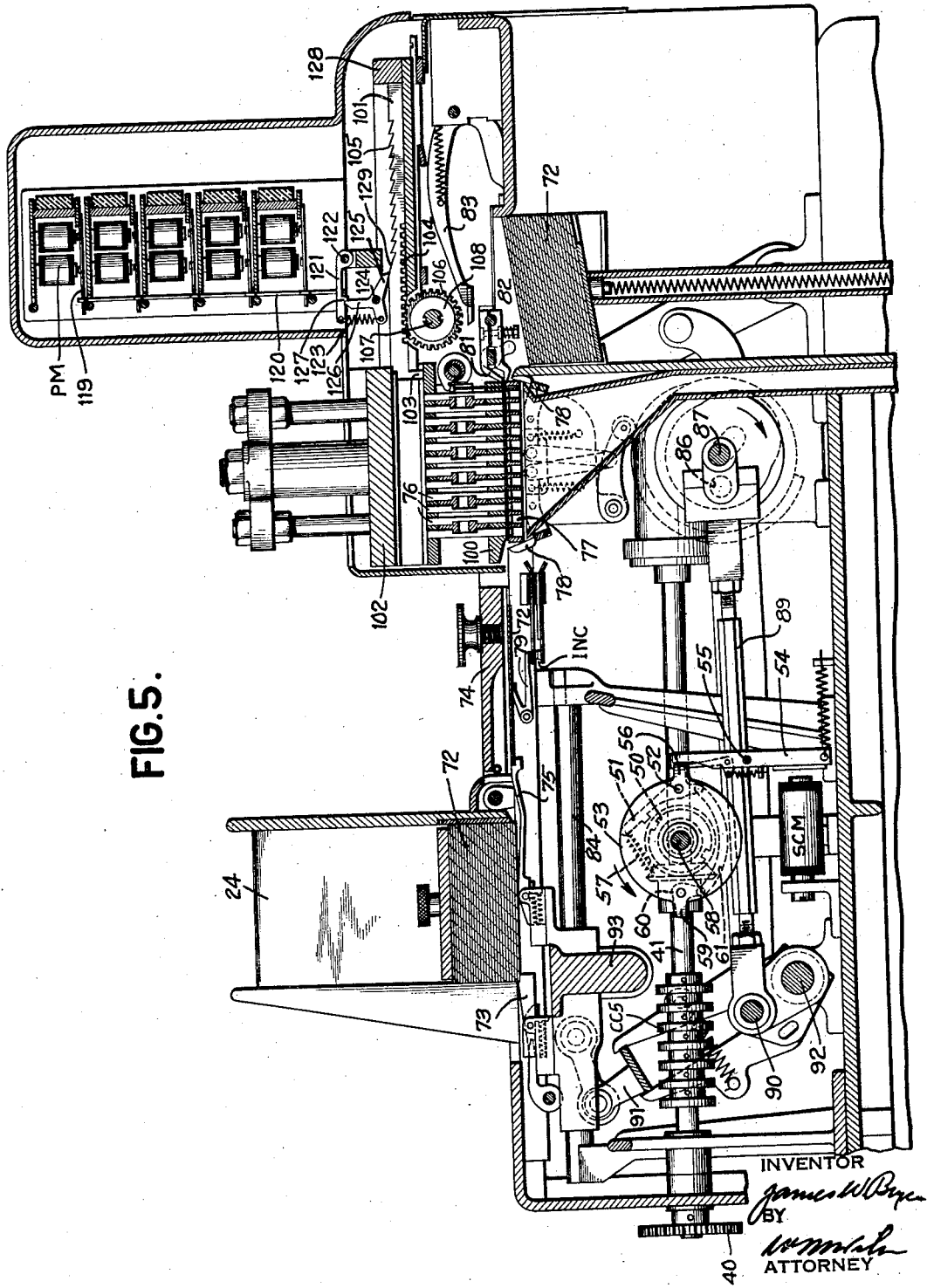
Fig. 5 is a sectional elevation view of the card feeding and punching devices.

Referring to Fig. 5 it is noted that pivoted at 52 on a plate 53 is a pawl 51 adapted to engage in one of a pair of notches cut in disk 50. Normally restraining the operation between pawl 51 and disk 50 is an armature latch 54 pivoted at 55 adjacent a selector control magnet SCM. When this magnet is energized the armature 54 is rocked in a clockwise direction to withdraw the upper hooked end from cooperation with a projection 56 on plate 53 and also frees pawl 51 for movement into notch 50 under the urging of spring 57. As soon as this clutch connection is made, the shaft 58 carrying plate 53 is connected to the turning shaft 41 and turns through one half revolution at which time armature latch 54 engages another projection 59 on plate 53.

Alongside projection 59 is a bell crank 60 connected by a link 61 to pawl 51. When bell crank 60 is rocked at the time the armature latch cooperates with projection 59, pawl 51 is rocked out of clutching position to disengage shaft 58 from the driving means.

Referring back to Fig. 6, it is noted that a series of cams DS1'—9' are mounted on shaft 58. Since this shaft is operated only on cycles where the punch selector devices are adjusted, the contacts DS1—9 controlled by cams DS1'—9' will have a corresponding time of operation. The other connections from shaft 58 to the punch selecting and interposer devices are described herein after along with the discussion of the feeding and punching of blank cards.

The pattern card analyzing section (Figs. 2 and 3) is provided with four pairs of card feed rollers 62 driven, as is customary in machines of this kind, by a train of gears connected to gear 43. A card picker device 63 is reciprocated by a link 64 connected to a crank pin on a gear 65 driven by a pinion 66, gear 65 making one revolution for each cycle of operation when a clutch connection is established by energization of magnet CFM. Pattern cards 25 (Fig. 3) are fed downwardly one at a time by picker 63 and feed rollers 62 guide the cards past upper analyzing brushes UB, there being one such brush UB for each card column. While passing between the first and second pairs of feed rollers 62 the card actuates an upper card lever 67 which closes contacts UC and while passing between the third and fourth pairs of feed rollers the card is analyzed by a set of lower brushes LB as it actuates a card lever 69 to close contacts LC. A plurality of such lower brushes LB are provided, one for each card column.

While the pattern card is passing the lower brushes LB, certain lower brushes make contact through the perforations and the electric circuits formed thereby act to control the setting of the punch selectors over interposers in the punching section as will be explained. Other of these lower brushes serve to read a number off a card and direct it into an accumulator to control the number of times that the punch section will operate to produce a certain number of copies of the pattern card being analyzed. The upper brushes serve to read group numbers such as the number represented by the perforations at the left on the sample card in Fig. 15 and compare such numbers with other numbers set up by the operator of the machine to control the selection of a number of copies according to the classification of the pattern.

If extra number cards are provided to carry the classification number or copy control number, each of these cards is fed through the analyzing section one cycle before the feeding of a related pattern card. Whatever form of control is used, the upper brushes always sense the classification numbers and the lower brushes sense the copy control numbers and punch data information represented on the cards. The direction of the electric impulses through the brushes is described more fully hereinafter with reference to the wiring diagram.

Figure 7:
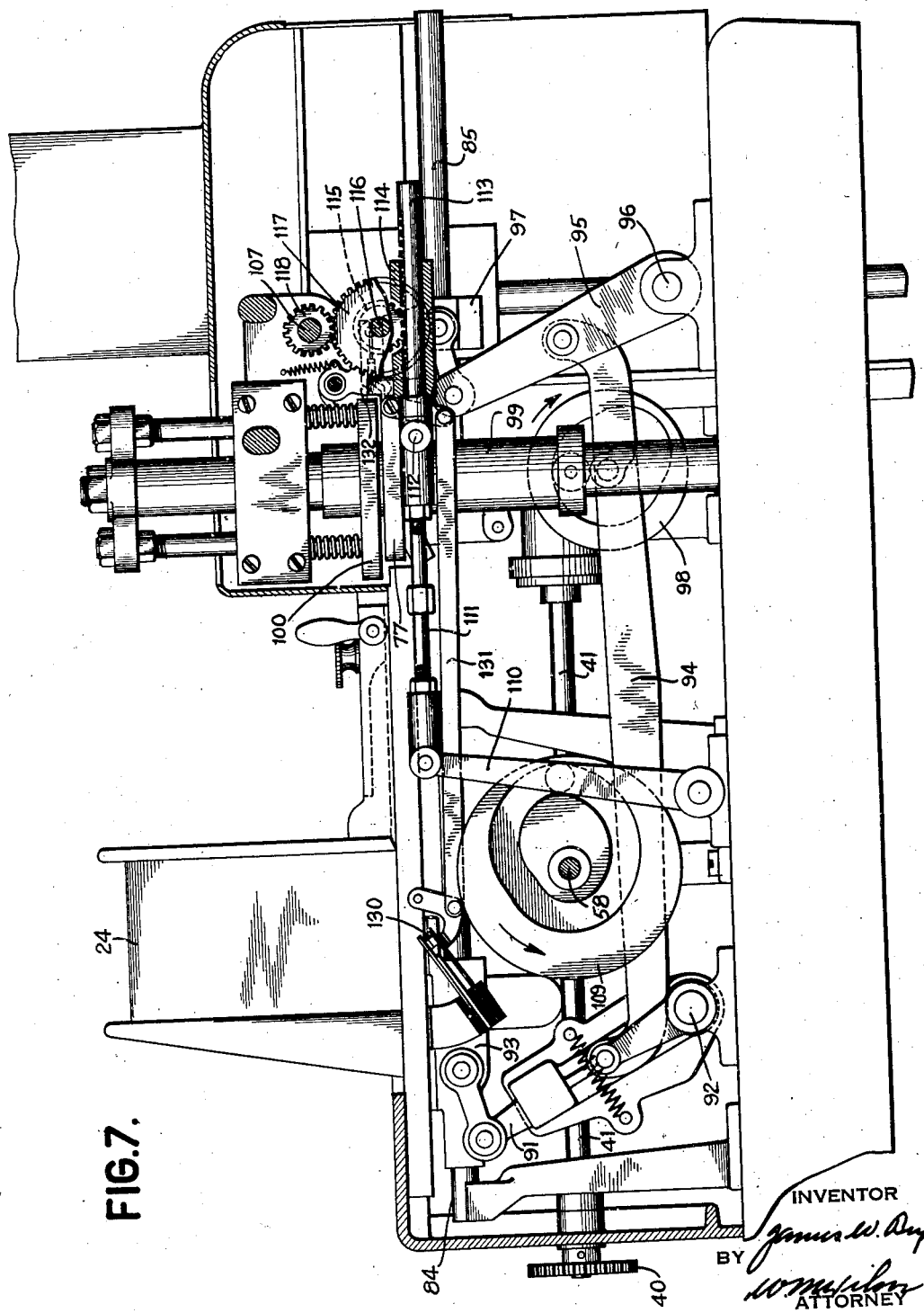
Fig. 7 is an elevation view of the punching devices shown with a portion of the case removed.

A general understanding of the punching section may be obtained from Figs. 5, 6 and 7. The blank cards 72 are placed in the magazine 24 (Fig. 5) and are fed therefrom one at a time by picker 73 to an intermediate position under plate 74. From this last mentioned position, the blank card is carried further to the right by a picker 75 which places the card in position under the punches 76 where the card is accurately positioned on a die plate 77 by fingers 78.

When a card is present in the intermediate position, it depresses a card lever 79 to close a pair of contacts INC denoting the presence of a card and effecting electrical control as explained hereinafter with reference to the wiring diagram.

After the card is positioned under the punches, it is first punched, as will be explained, and is then seized by a gripper device 81 by which it is removed to a position above discharge stack 82 where it is impelled by an arm 83 to the top of the stack. Pickers 73 and 75 and gripper 81 are moved back and forth in unison, all three being movable on horizontal parallel rods 84 and 85 (Fig. 7). They are reciprocated by a common driving linkage operated by a crank 86 (Fig. 6) on a shaft 87 having a worm and worm wheel connection to shaft 41 concealed by housing 88. A link 89 (Fig. 5) encircles crank 86 at one end and at the other end is pivoted at 90 to flexible driving connections 91 fulcrumed at 92. These connections are articulated to a sliding block 93 carrying both pickers 73 and 75.

Referring to Fig. 7, it is noted that a link 94 is connected between arm 91 and another arm 95 pivoted at 96 on the base of the machine. The top of arm 95 is connected to a sliding block 97 carrying the gripper 81 (Fig. 5). Through the described connections, the energization of magnet FPM (Fig. 6) causes the rotation of shaft 41, the turning of crank 86 and the oscillation of arms 91 and 95 carrying therewith the pickers and the gripper to feed the blank cards and stack them after they are perforated.

On the ends of shaft 87 (Fig. 6) are box cams 98 which effect the punching operation by reciprocating vertically the sleeves 99 that carry the die plate 77 (Fig. 5) and stripper plate 100 with the card between them. All the punches ride freely upwards on the top of the card except those punches prevented from rising by the interposer or selector bars 101 positioned above them. The method of positioning the selector bars will now be explained.

The punches 76 are arranged in a plurality of rows with twelve punches in each row, so spaced that when a record card is on the die plate 77, one punch will rest on each index position on the card including the two extra positions sometimes used above the zero position. Each row of twelve punches corresponds to a column on the card. Above the punches and spaced from them is a fixed plate 102. Arranged to travel above the punches and beneath plates 102 are the plurality of punch selector bars 101, there being one bar for each card column. Each selector bar has a downwardly projecting lug 103 and the function of the punch control devices is to position lugs 103 above the punches that are to be made effective. After the bar is positioned above a certain one of the punches, the die plate 77 is raised by cams 98 and all the punches are raised by the card except the selected punch which is held down by the lug 103 on the selector bar; thus forcing the punch through the card and punching a hole at the index position covered by that particular punch. Each selector bar 101 has rack teeth 104 cut on the bottom edge and twelve ratchet teeth 105 in the upper edge, one ratchet tooth being provided for each punch. In mesh with each rack is a gear 106 free to turn on a shaft 107 but pinched between two friction disks 108 fast to shaft 107 and compressed longitudinally on the shaft by a spring (not shown) so that when the shaft is turned each gear 106 turns with it. The gear 106 is frictionally driven until the selector bar with which it is meshed is stopped by a positive means whereupon the gear is also stopped being held by the bar regardless of the driving effort of the friction disks 108.

Mounted on the end of shaft 58 previously referred to (Fig. 6) is a box cam 109 that makes a half revolution for each operation of magnet SCM in closing a clutch between shafts 41 and 58. Through these driving connections, the selector bars are set up during the analyzing of a pattern card and held set up during a selected number of subsequent punching operations; after which another energization of magnet SCM serves to restore the selector bars in readiness for a new setting. Continuing the tracing of the connections between the driving means and the means for setting up the selector bars, it is noted in Fig. 7 that attached to the upper end of an arm 110 actuated by cam 109 is a link 111 connected at 112 to a rod 113 which is guided for reciprocation in a bearing 114. Rod 113 has rack teeth on the upper side in mesh with a gear 115 secured to shaft 116 which also carries a gear 117 meshing with a pinion 118 secured to the selector bar drive shaft 107.

It will be evident that connected as pointed out above, when rack bar 113 moves to the right, the selector bars 101, (Fig. 5) will be restored to the right, and when bar 113 moves to the left, the selector bars will be differentially positioned to the left. During one portion of the cycle of operation of the punch section, cam 98 is inactive. Die plate 77 is thus allowed to remain in its lowered position. This portion of the cycle is utilized to move the grippers 81 (Fig. 5) to the right thereby removing the previously punched card from the dies and feeding a new card into position in the punch.

During this same portion of the cycle, cam 109 draws all selector bars to the left, each bar passing above the top of the corresponding row of punches. If there is a perforation in the pattern card in a column related to the column of punches traversed by a selector bar, the bar is stopped with the lug 103 over the appropriate punch 76, but any bar that meets with no interference passes clear across the punches stopping to the left of the punches and no hole will be punched in the card column corresponding to that row of punches.

The selector bars having been set during the above mentioned part of the cycle, the next portion of the cycle is carried out during which the die plate is raised and retracted by cam 98 thus punching the card and leaving it free to be removed by the grippers 81.

Coordinated with each selector bar 101 and located above it is a magnet PM, a plurality of such magnets being arranged for convenience in banks as shown in Fig. 5. Each magnet has an armature 119 and depending from each armature is a link 120 supporting at the lower end a latch arm 121 pivoted at 122 and drawn downwardly by a spring 123. Pivoted at 124 on the frame is a pawl 125 arranged when unlatched to engage a tooth 105 on a corresponding selector bar 101. Pawl 125 has an upstanding arm 126 which is normally latched on the left side of a projection 127 on the lower edge of arm 121, in which position pawl 125 is held out of engagement with the teeth 105. Pawl 125 is urged in a clockwise direction by the spring 123 which is connected between the pawl and arm 121. Each magnet PM is electrically connected to a brush LB (Fig. 3) sensing a related card column on the pattern card 25 and the magnet is controlled by the appearance of a perforation in the sensed card column.

The pattern cards 25 are fed past the brushes with the bottom edge being sensed first and the index positions pass the brushes in the order 9, 8, 7, etc. The movement of the selector bars 101 to the left is synchronized with the passage of the pattern card past the brushes LB so that lug 103 is over the punch corresponding to each index position at the same time that the brush is in contact with that same index position on the card. If the brush senses a perforation in the card at that position, a circuit is formed through the perforation resulting in the energization of the magnet PM coordinated to that column, its armature then being actuated, the latch arm 121 being drawn up and pawl 125 released. The pawl thereupon drops into a notch 105 in the related selector bar, stopping the bar with the lug 103 above the punch 76 corresponding to the perforation in the pattern card. This movement of the selector bars to the left completes the first portion of the punching cycle, with a selector bar in each column in position to hold down the punch corresponding to the perforation sensed by the brush in the card column to which the selector bar is coordinated. With the selector bars so positioned, the second portion of the cycle takes place in which cams 98 raise and lower the die plate thus effecting the punching operation and producing a card which is a reproduction or copy of the pattern card.

After the required number of copies have been produced, the selector bars are retracted to their home position with the right end against frame member 128. In this position, the high portion 129 of each selector bar is under pawl 125 thus carrying the vertical arm 126 to the left of shoulder 127, arm 121 then being lowered as the related magnet PM is deenergized.

There is provided a pair of contacts 130 (Fig. 7) designed to be opened automatically through the agency of link 131 and pivoted member 132 whenever the supply of cards is exhausted, thereby stopping the machine as is fully explained in the patents already mentioned.

Figure 1:
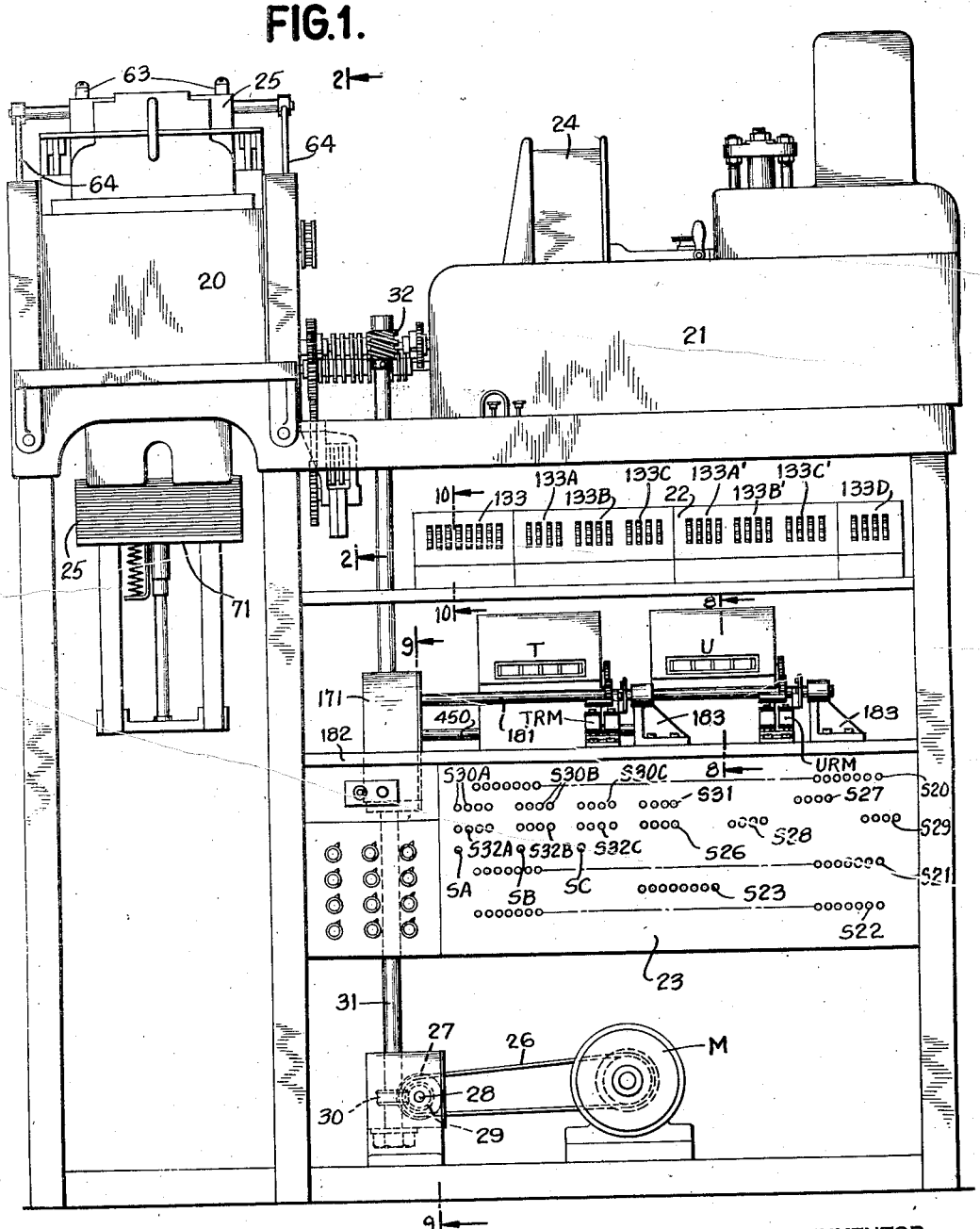
Fig. 1 is a front elevation view of the machine.
Figure 10:
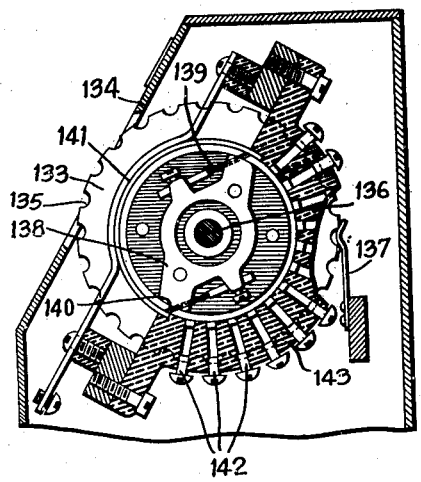
Fig. 10 is a sectional elevation view taken along line 10—10 in Fig. 1 and showing one of the manually adjusted data setting devices for controlling the punching of a portion of the record card.

In addition to the control of the perforating devices by the pattern card, other data may be perforated in the cards under control of a set of manually adjusted wheels 133 (Fig. 1). An enlarged view of one of such wheels is shown in Fig. 10. Since all of the wheels shown alined in section 22 in Fig. 1 are similar in construction, a description of one applies as well to all others.
Each wheel 133 (Fig. 10) extends beyond a cover plate 134 and is formed with a series of notches 135 adapted to be engaged by a finger of the operator and turned to any one of two sets of twelve positions, indicated on the periphery of the wheel. The wheels are free to turn on shaft 136 being held in position impositively by a spring detent 137. Attached to each wheel is a brush holder 138 carrying a pair of brushes 139, 140, one of which is adapted to contact a common conducting sector 141 at the same time that the other brush contacts one of the twelve contact spots or terminal segments 142 arranged in a semi-circular arc around a commutator insulation frame 143. By means of this construction, the wheel 133 may be moved by hand until any one of the twelve segments 142 is connected into the control circuit through brushes 139 and 140. These segments correspond to the twelve index point positions in a column of the pattern card.
Each segment has a different data value by virtue of the differential timing of an impulse directed through them and through the punch control magnet PM which is energized at a time determined by the position of wheel 133.
Referring to Fig. 1, it is noted that a plurality of other sets of wheels similar to wheels 133 are provided in section 22. These wheels are similar in construction to the described wheels 133 but they are provided for other purposes. The three groups of wheels 133A, 133B and 133C are provided to set up card classification numbers and other three sets of wheels 133A', 133B' and 133C' are provided to set up numbers to control the number of copies of record cards to be reproduced when pattern cards are encountered of a class represented by the numbers set up on the first three sets of wheels. The other set of wheels 133D is provided so that the operator will have a means for setting up a number to control the number of copies or reproductions to be reproduced by the punches under control of one pattern card and any data that may be set up on wheels 133. The control of the wheels 133 over the data to be punched and the control of the wheels 133D over the number of copies to be punched and the further control of all the other manually set wheels over the number of copies produced according to classification of the pattern card, is explained more fully hereinafter with reference to the electrical connections that are set up by the adjustment of these wheels and a comparison of the number set up by the classification wheels with the number sensed on the pattern cards.

Figure 2:
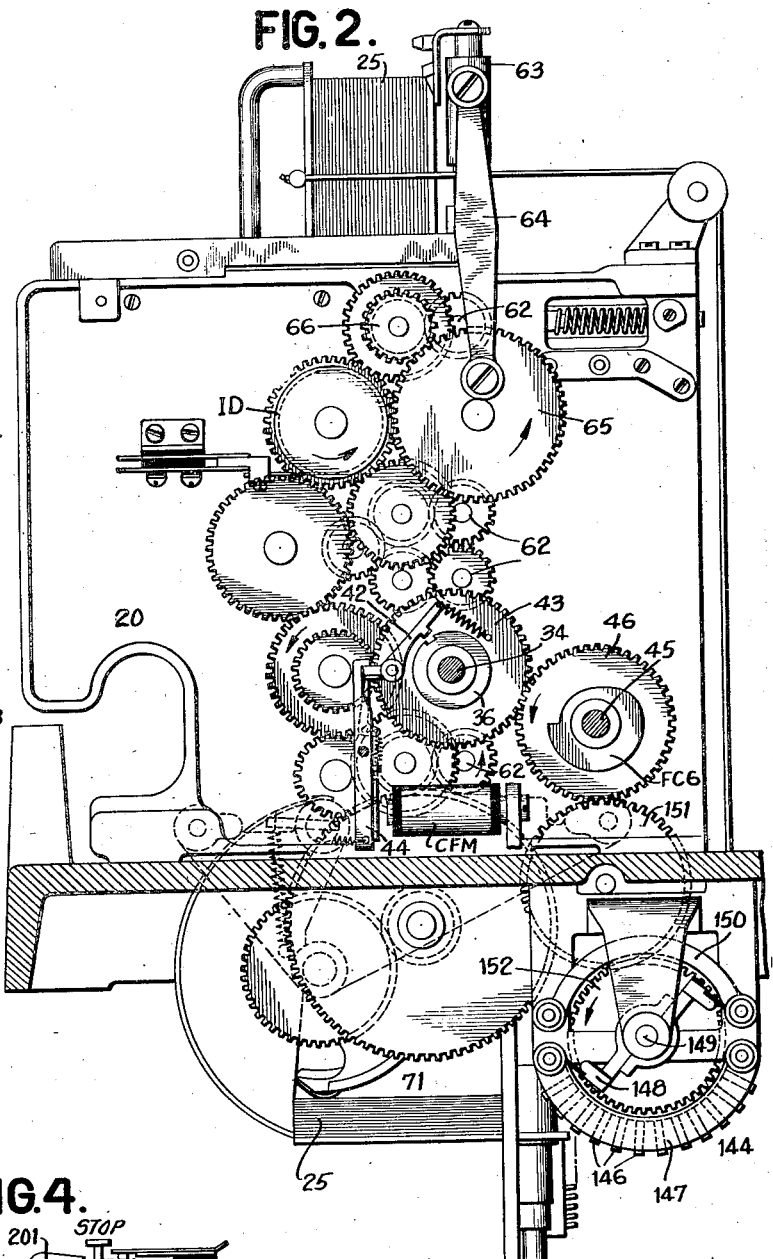
Fig. 2 is a side elevation view taken along line 2—2 of Fig. 1 showing the feeding devices for moving the pattern card.

It is mentioned hereinbefore that after the commutator devices such as those shown in Fig. 10 have been set up, differentially timed impulses are directed therethrough to control operation of the punching mechanism. For this purpose, a pair of emitters 144, 145 are provided, one of which is shown at the bottom of Fig. 2. A series of twelve contact segments 146 (ten segments in each order of emitter 145) are arranged in the semi-circular position in commutator frame 147 and made effective by successive contact of brushes on a rotating brush holder 148 pivoted on shaft 149 in the center of the arcuate arrangement of segments 146 and a common contact sector 150.

The brush frame 148 is rotated in synchronism with the feeding of a pattern card 25 by gear connections to shaft 45 driven whenever magnet CFM (Fig. 6) is energized. The gear 46 attached to the shaft 45 meshes with an idler gear 151 which, in turn, meshes with gear 152 attached to the brush holders 148 in emitters 144 and 145. Through these connections, an impulse is directed through the segment 146 (Fig. 2) corresponding to the nine index position and carried electrically through terminal segment 142 (Fig. 10) corresponding to the same index position at the time that the nine index position is analyzed on the pattern card 25 (Fig. 3) passing the sensing brushes. In the same manner all other differentially timed impulses are synchronized through the emitters and the manually adjusted commutators with relation to the movement of the pattern card.

The connections between the emitters and the adjusted commutators are shown diagrammatically in the wiring diagram (Figs. 14 and 14a) and there adapted for a clearer explanation.

In Fig. 1, two accumulators T and U are shown mounted at the center of the machine. The accumulator U is adapted to add a unit for each punching operation of the machine and thus keep a count of the number of copies reproduced under control of one pattern card. The number added up in accumulator U may be compared with the number set up in accumulator T or a number set up in the wheels 133D. The number entered in accumulator T is read off a portion of the pattern card or analyzed on the passage of a special number card provided for the purpose of limiting the number of copies to be punched.

Other numbers set up in manually adjusted wheels 133A', 133B' or 133C' may be entered into accumulator T and there compared with the number gradually accumulated in the accumulator U for the purpose of determining the number of copies punched. Once a number is set up on the manually adjusted wheels or entered into the accumulator T it is fixed, but the number in accumulator U varies by having one unit added therein on each punch operation and thus gradually approaches the limiting number until both numbers coincide and then punching is interrupted until a new pattern card is analyzed to adjust the selector bars to a new setting. The internal construction of both accumulators T and U is the same and takes the form shown in Fig. 8. This accumulating and total reading mechanism is of the type shown in Patent 1,921,454 to G. F. Daly.

In the accumulating mechanism, a toothed sleeve 153 (Fig. 8) is splined on shaft 154 and free for longitudinal movement thereon. Shaft 154 is driven by gear connections to a drive shaft 450 which is operated by the main drive shaft 31 as explained hereinafter with reference to the resetting drive. The clutch sleeve 153 is normally held out of engagement with clutch teeth on the accumulator drive gear 155 by a lever 156 pivoted at 157 and latched in position by a block 158 engaging a shoulder 159 on an armature latch 160. The latch 160 is controlled by an accumulator magnet AM which is energized at a differential instant corresponding to the sensing of a perforation at one of the index positions on a pattern card. When a large number such as nine is read on the card, magnet AM is energized early in the operation, while a smaller number perforation is sensed later in the operation to cause release of the lever 156 later in the operation and a corresponding smaller degree of movement is imparted from sleeve 153 to gear wheel 155. As lever 156 is released, it operates to open a pair of contacts 80 in series with magnet AM to immediately deenergize the magnet.

The gear 155 is in mesh with two other accumulator gear wheels 161 and 162, the former carrying an indicating wheel 163, a resetting pawl 164 and a transfer cam 165 and the latter carrying a brush holder 166.

The total amount accumulated in any accumulator order is indicated by a contact of one of the brushes on frame 166 with one of ten contact segments 167 at the same time that the other brush on frame 166 contacts with a common contact sector 168. Through these commutator devices arranged at the top of the accumulator, a total reading of the amounts accumulated in the accumulator may be taken at any time during the operation of the machine.

The units order magnet AM in accumulator U is connected in a manner to be energized at the one index position during each cycle of operation of the machine. In this manner, a number is gradually accumulated in the accumulator U which may be compared with other numbers through readings taken from the commutator devices automatically adjusted at the top of the accumulator U. The other accumulator T may receive a full number comprising a plurality of different denominational digits in one operation and under control of a reading of perforations on a pattern card or settings of wheels 133A', 133B' and 133C'. In the same way, this accumulator operates accumulator wheels on a shaft such as shaft 169 (Fig. 8) and adjusts commutator devices such as those arranged around shaft 170.

Figure 8:
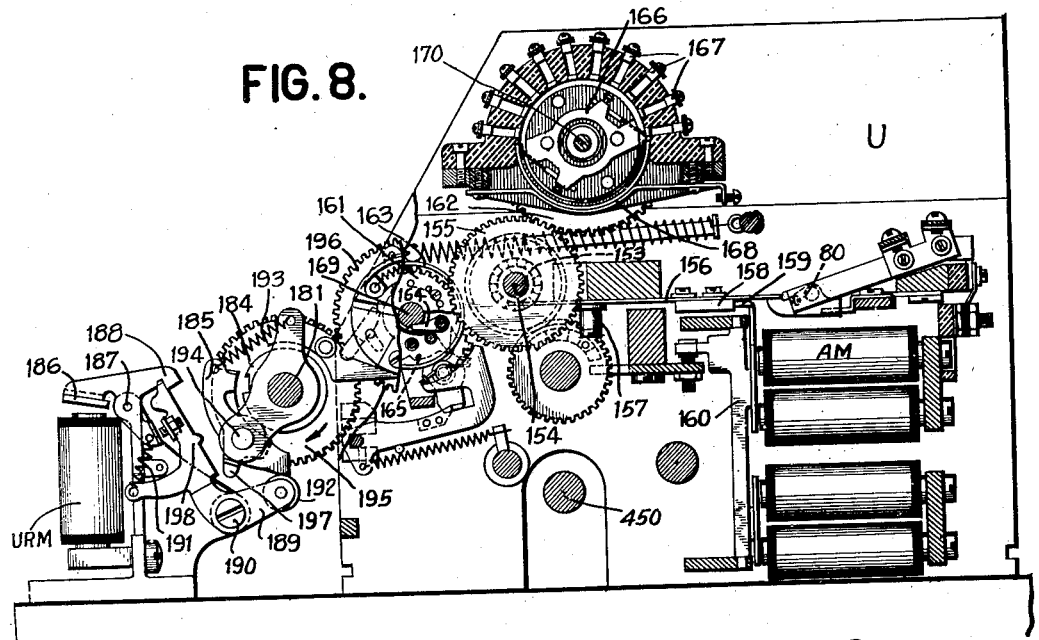
Fig. 8 is a sectional elevation view taken along line 8—8 in Fig. 1 and showing the operating mechanism of one of the accumulators.

After the accumulators have served to control the punching of one set of copies of a pattern card, it is necessary to reset them before they may be adjusted again to control the punching of another set of reproductions. For this purpose, a train of connections are provided between the driving shaft 31 (Fig. 9) and the accumulator resetting shafts 169 (Fig. 8).

In Fig. 9, it is noted that the driving shaft 31 runs through a housing 171 containing the gearing for operating a resetting mechanism. A worm gear 172 on shaft 31 meshes with a worm wheel 173 carrying a pinion 174 fastened to the accumulator drive shaft 450. This pinion drives a gear 175 provided with a series of four rollers 176 spaced at regular intervals on one side of the outer edge of the gear 175. As the gear 175 rotates, the rollers 176 engage the slots in arms of a spider 177 fixed to a planetary gear 178 pivoted on a shaft 179. This Geneva gearing connection is adapted to move gear 178 with a gradually accelerated and gradually retarded movement. The internal teeth on planetary gear 178 mesh with a gear 180 fastened to a shaft 181. This shaft 181 (Figs. 1 and 8) passes in front of both accumulators T and U and is supported by a pair of brackets 182 and 183. The shaft carries a pair of notched disks 184 (Fig. 8) with which a pair of pawls 185 cooperate to drive the two separate accumulator resetting shafts 169. The connections between pawls 185 and disks 184 are controlled separately by resetting magnets TRM and URM associated with the magnets T and U, respectively. Similar forms of tripping mechanism are operated by the resetting magnets.

When the magnet URM (Fig. 8) is energized, it attracts an armature 186 pivoted at 187 and formed with a latching hook 188 normally restraining a bell crank 189 from movement about pivot 190 in a clockwise direction. However, when the armature is attracted, the bell crank 189 is permitted to rock under the urging of spring 191 and a roller 192 on the crank is withdrawn from cooperation with pawl 185, thus freeing the pawl so that a spring 193 attached thereto may draw the pawl into cooperation with disk 184. The pawl is pivoted at 194 on a gear 195 loosely mounted on shaft 181.

The gear 195 meshes with another gear 196 fixed to the notched resetting shaft 169. Since shaft 181 is revolving in a clockwise direction, whenever gear 196 is connected thereto the resetting shaft 169 makes one complete revolution in a counterclockwise direction, the shoulder of the notch on the shaft picking up all the pawls 164 and the connected accumulator wheels to bring all accumulator wheels back to the normal zero position. Early in the resetting cycle, an extension 197 cooperates with a projection 198 on bell crank 189 to restore the bell crank and armature to normal position, then later in the operation when the pawl 185 approaches the roll 192, this roll acts on the pawl to disengage it from disk 184 after one complete cycle of operation has been made.

The driving connections are proportioned so that certain parts go through two operating cycles at the same time that other parts cover only one complete cycle. As shaft 34 (Fig. 6) goes through one revolution to feed a pattern card from the magazine to the lower brushes LB, both the accumulator drive shaft 450 (Figs. 8 and 9) and resetting drive shaft 180 go through two revolutions. The selector bars 101 are set by cam 109 during the first half of the operating cycle of drive shaft 34 and later the bars are reset during the second half of an operating cycle. The emitters make two reading cycles to every operating cycle. These relationships are brought out in Fig. 11 and discussed hereinafter with reference to the wiring diagram in Figs. 14 and 14a.

Figure 3:
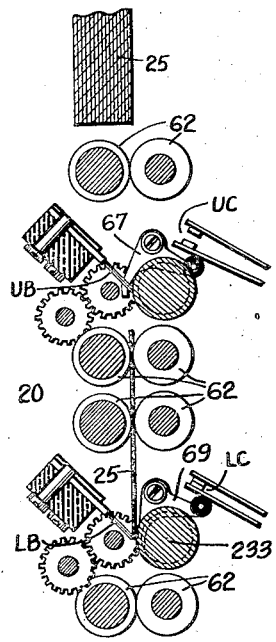
Fig. 3 is a sectional view of the analyzing devices cooperating with the perforated controlling cards.
Figure 11:
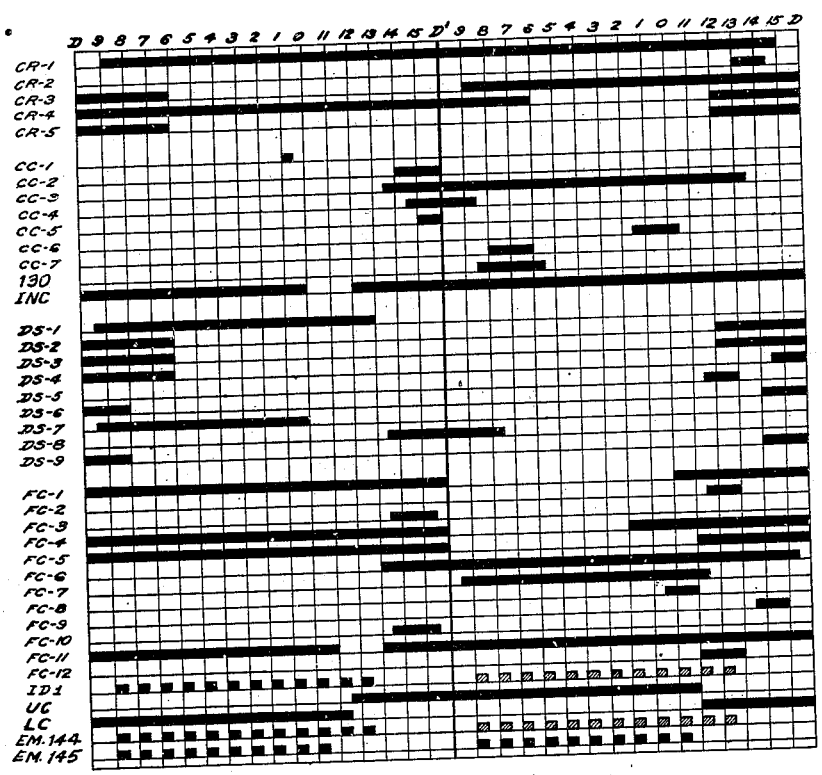
Fig. 11 is a timing diagram showing the time of operation of the various contacts in the machine.
Figure 12:
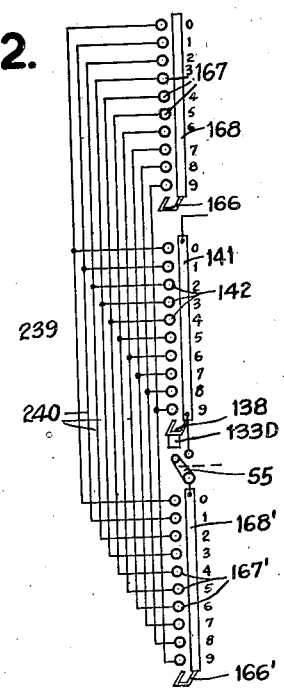
Fig. 12 is an enlarged detail of a portion of the wiring diagram showing the wiring connections for a selective comparing control between two accumulators or between one accumulator and a manually set device.

Referring to Fig. 11 the course of travel of a card as it passes through the upper and lower brushes may be compared with the timing of the many contacts in the machine. At the beginning of a cycle with a card 25 in the sensing section 20, as shown in Fig. 3, the edge of the card passes under the lower brushes at the point D (Fig. 11) and then the index points 9, 8, 7, etc., are sensed in sequence as the card passes down.

The point D' marks the beginning of the sensing of a second card under the upper brushes. After passing through the sixteen points of the cycle from D' to D under the upper brushes, the same second card is passed from D to D' under the lower brushes.

The selector bars 101 (Fig. 5) are adapted to be set in the period from the 9 to the 12 index points (Fig. 11) in the cycle between D and D' while a card is passing the lower brushes. When once set they are held in position and only restored late in the cycle from D' to D after the punching operation has taken place. The punching operation is effected by the raising and lowering of the die plate shortly after the point D'.

Figure 4:
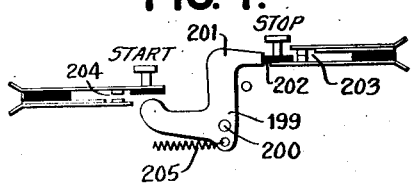
Fig. 4 is a detail view of the latch connections between the start and stop keys.

The interlock shown in Fig. 4 is provided between the start and stop keys for the purpose of latching contacts in an opened position when operated by the stop key and releasing the same contacts when the start key is depressed. A latch lever 199 is pivoted at 200 and formed with a latch projection 201 that is adapted to latch over an insulation block 202 on the lower blade of a pair of contacts 203 opened by the stop key. Once the contacts are opened by the depression of the stop key, they are held opened by the lever 199 until the start key is operated. The start key closes a pair of contacts 204 and rocks the lever 199 in a counter-clockwise direction against the latching pull of spring 205, releasing the block 202 and permitting the contacts 203 to close again.

With the above described mechanical construction in mind, the electrical controls of the machine may be fully understood by reference to the circuit diagram in Figs. 12, 13, 14 and 14a and the timing chart in Fig. 11.

The machine is prepared for operation by closing the switch PS to the power source, thus energizing lines 206, 207, and the motor M connected between the lines. The energized motor M operates the connected drive shaft 34 (Fig. 6) and continuously rotates the clutch disks 35 and 36 in readiness for card feeding operation.

Depression of the start key serves to energize a relay A which closes control contacts in series with the card feed clutch magnets CFM and FPM. The starting circuit includes the line 206, start contacts 204, wire 208, relay magnet A and wire 209 to line 207. The energized magnet A closes associated contacts A1, A2 and A3. Contacts A1, when closed, direct a holding circuit through magnet A so that the start key may be released after a momentary depression. The circuit may be traced from line 206, through contacts CR1 closed during two cycles of the card feed drive, wire 210, contacts A1, magnet A and wire 209 to line 207. Near the end of the second cycle, the contacts CR2 close to complete circuits through contacts A2 and A3 for the energization of magnets CFM and FPM. The circuit through clutch magnet CFM is along line 206, wire 211, magnet CFM, wire 212, switch S1, contacts B1', contacts A2, contacts CR2, stop key contacts 203 and line 207. The other circuit includes line 206, wires 211 and 215, magnet FPM, contacts M3, J3, F3, B2' and A3, wire 216, contacts CR2 and 203 to line 207.

The energized clutch magnets CFM and FPM attract armatures 217 and 218, closing contacts 219 and 220, respectively, to form holding circuits for both magnets through a wire 221 and contacts CR3 closed near the end of a cycle and held closed for a portion of the next cycle. Thus the two card feed clutches are operated to feed a pattern card 25 (Fig. 2) through the analyzing section 20, and to feed a blank card 72 (Fig. 5) out of magazine 24 and over to the punching die. If cards are present in the magazines, the operation is sustained by the closing of card lever contacts UC and LC (Fig. 3) and contacts INC at the intermediate position of the blank card.

The closing of contacts INC by a blank card operating lever 79 causes the energization of relay magnet B and a later operation of lever 69 by the pattern card closes contacts LC and energizes magnet C. The circuit through B is along line 206, through contacts INC, wire 222, magnet B and line 207. The energized relay magnet B shifts a series of contacts B1—4 to provide for sustained operation after the first cycle when contacts CR3 open to deenergize magnets CFM and FPM. Relay C cooperates with magnet B by shifting contacts C1—5 when energized by the circuit from line 206, through contacts LC, wire 223, magnet C and wire 224 to line 207. Thereby preparation is made for a second energization of magnet CFM through contacts B1, wire 225, contacts C1, wire 226, wire 216, contacts CR2 and contacts 203 to line 207. Magnet FPM is also actuated a second time through contacts B2, contacts C1, wire 226, wire 216, contacts CR2 and contacts 203 to line 207. At the same time a circuit for actuating the punch selector bar set up control magnet SCM is prepared by the closed contacts B3 and C2. Tracing this circuit, it is found to pass from line 206 through magnet SCM, contacts M2, J2 and F2, switch S2, contacts C2 and B3, wire 216, contacts CR2 and 203 to line 207.

A holding circuit is formed by magnet SCM attracting its associated armature 227 and closing contacts 228 in line with wire 229, switch S3 and contacts CR4. Then clutch pawl 51 (Fig. 6) is connected to disk 50 to drive cam 109 and operate the linkage 110, 111, 113 (Fig. 7) and move the selector bars 101 (Fig. 5) in synchronism with the passage of the pattern card 25 under the lower brushes LB.

As the perforated card passes under the sensing brushes, the perforations are sensed at differential times according to their differential position on the card, and the impulses initiated thereby are directed through punch magnets PM which serve to stop the selector bars in related punching positions as explained hereinbefore. A typical punch control circuit may be traced in Fig. 14a from line 206 through wire 230, wire 234, impulse distributor ID, wire 231, common brush 232, contact roller 233 and through the card when a perforation allows a brush LB to touch roller 233, socket S21 and a plug wire to socket S22, magnet PM and contacts DS1 to line 207. After all the selector bars are positioned, the cams 98 (Figs. 6 and 7) act to lift the die plate 77 to punch the card 72 which is then a copy of the card 25. It should be noted that, since clutch magnet FPM controls the rotation of shaft 41 (Fig. 6) crank 86 and cams 98, it controls both the card feeding and the punching of card 72.

The foregoing description of the electrical controls is concerned with ordinary reproducing, i. e. the machine is set to make one copy of each pattern card. It is apparent that the data on the pattern may be transposed or eliminated by shifting or disconnecting the plug wires between sockets S21 and S22. The present invention contemplates a further advantage in reproducing, namely, the punching of data set up by hand along with the punching of the data sensed on the pattern cards. This is noted as the type I form of operation noted in Fig. 16.

It has been pointed out with reference to Figs. 1 and 10 that certain wheels 133 may be adjusted to set up any data on the commutator devices 138 and 142. These devices are shown diagrammatically at the lower left hand corner of Fig. 14a. They are in series with the emitter 144 which is timed and connected to rotate in synchronism with the passage of a card under the lower brushes. If only manually set data is desired, blank cards may be fed past the lower brushes while the cards 72 are being punched under control of emitter 144 and manually set wheels 133. The punch control circuit through emitter 144 may be followed from line 206 through contact sector 150, brush holder 148, any one of the segments 146 and lines 235, the spot 142 selected by the positioned wheel 133 with holder 138 and brushes 139 and 140 touching the spot and contact sector 141, plug socket S23 and a plug wire to socket S22, magnet PM, and contact DS1 to line 207. Thus certain selector bars may be set according to the setting of wheels 133 at the same time that other bars are set by the data readings of the lower brushes LB.

As the pattern cards 25 pass to the lower brushes LB (Fig. 3) they operate card lever 67 adjacent the upper brushes and close control contacts UC. These contacts are in series with a control magnet E (Fig. 14) which serves to open contacts E1 and close contacts E2 (Fig. 14a). The circuit for magnet E includes line 206, wire 236, magnet E, wire 237, contacts UC, wire 238 and line 207. The opening of contacts E1 serves to interrupt feeding of blank and pattern cards under conditions described hereinafter. The closing of the other contacts E2 connects the upper brushes UB in circuits for comparison control as explained farther on.

When the last blank card is fed into the dies, magnet B is deenergized and contacts B2 open, tending to deenergize magnet FPM. In order to feed the last punched card out of the dies, a pair of closed contacts B2' are provided in series with the contacts 130 for energizing a sustaining circuit through the card feed clutch magnet FPM. This circuit may be followed from line 206 through wires 211, 215, magnet FPM, contacts M3, J3, F3, B2', wire 410, switch S12, contacts CC7, contacts 130 held closed as long as a card is in the dies and line 207.

Certain accounting problems require the punching of more than one copy of a pattern card. The first of these forms of operation to be taken up is noted as type II and shown diagrammatically in Fig. 17. The number of copies desired may be set up on the wheels 133D (Figs. 1, 10 and 14a), by the operator of the machine. As seen in the right-center section of Fig. 14a, these wheels set commutator devices 138, 141 and 142 in readiness for comparison with the number added up unit by unit on the commutator devices 166, 167 and 168 of the accumulator U shown directly above the manually set commutators. Cables 239 (Figs. 12 and 14a) each contain a set of wires 240 connecting the related contact segments 142 and 167 of the same order of the two commutator devices. Once the punching of the blank cards is started, it continues until the numbers in accumulator U and on wheels 133D agree, then punching and feeding is stopped until a new set up is made. In order to get control to produce the type of operation described, switches S1, S2, S3, S4, S12 and S13 (Figs. 14 and 14a) are moved out of the positions in which they are shown. Before describing the results produced by shifting the switches, an explanation of the adding of the number in accumulator U representing the number of cards punched, and the comparison of the number with the manual set up is given hereinafter.

A unit is added in the units order of the accumulator U by the closing of contacts CC1 at the "1" index position in each punching cycle. The contacts are in series with the units order adding magnet AM and renders the same effective to add a unit. The circuit through AM leads from line 206 (Fig. 14a) through wire 230, wire 234, wire 241, contacts B4 closed when a card is in the intermediate position ready to be punched, contacts CC1, magnet AM', contacts 80, switch S13 and line 207. As unit after unit is added in accumulator U the brushes on holders 166 are moved along segments 167 until agreement is reached with the setting of commutator devices 138. Then a circuit is completed through comparison control magnet D. The circuit may be traced from line 206 (Fig. 14a), through wire 230, wire 234, wire 242, switch S4 closed for comparison control, contacts DS8 closed when the selector bars are set, contacts CC2 closed after the unit is entered into accumulator U and before the punching of the card, wire 243, left switch S5, wire 244, contact sector 141, through the brushes and holder 138 to a selected segment 142, then through a wire 240 to a corresponding segment 167, and, if the number is similar, through the contacting brush holder 166 to sector 168, wire 245 to the next higher order, and then in a similar way through all the orders of accumulator U and wheels 133D. The circuit continues from the highest order sector 168, through wire 246, (Fig. 14), magnet D and wire 247 to line 207.

The magnet D then operates a number of contacts D1—7 to stop card feeding and punching until another selector bar adjustment is made. Contacts D1 establish a holding circuit through wire 247, magnet D, contacts D1, wire 248 and contacts CC—3.

The movement of switch S2 to cut in the contacts DS3 and D2 adapts the magnet SCM to control the selector bars so that once they are set up they are held set up during the punching of the required number of copies and restored only when an agreement is reached with the number set up on wheels 133D which agreement is evidenced by the energization of magnet D. Magnet SCM is first energized by a circuit through the normally closed contacts DS3. The circuit includes line 206, magnet SCM, contacts M2, J2 and F2, switch S2, contacts DS3, C2 and B3, wire 216, contacts CR2, 203 and line 207. Clutch lever 54 (Fig. 6) is actuated and the shaft 58 with the cams thereon for contacts DS is turned through a half revolution and stopped. Thus the selector bars are set and the contacts DS3 are opened to prevent a following energization of magnet SCM. Since switch S3 is also shifted, the holding circuit is not sustained at the midpoint of the operation through contacts CR4, but is opened by the early separation of contacts CR5. Magnet CFM is also deenergized immediately after the feeding of a pattern card past the lower brushes. This is accomplished through the adjusted switch S1 which calls in contacts DS2 that open and remain open when the selector bars are set.

The setting of switch S12 calls in means for sustaining energization of magnet FPM to cause feeding and punching of the blank cards when the last pattern card is fed. This circuit is held until magnet D is energized. The sustaining circuit may be followed from line 206 through wires 211 and 215, magnet FPM, contacts M3, J3, F3 and B2, wire 249, contacts E1, D5 and C4, wire 250, switch S12, contacts CC7, contacts 130 closed while cards are in the die, and line 207.

The gang punching operation continues with the successive energizations of clutch magnet FPM causing feeding and punching of the blank cards with data held set up by deenergized magnets CFM and SCM, until comparison is reached when the required number of cards have been punched. Then magnet D closes contacts D2 to energize clutch magnet SCM again and to restore the selector bars. At the end of the restoration of the selector bars, contacts DS2 close ready for the energization of CFM and the feeding of a new pattern card past the lower brushes, and contacts DS3 close for the new setting of the selector bars. The circuit for magnet SCM includes switch S2, wire 251, contacts D2, wire 252 and contacts CC4.

Contacts D7 are also closed by magnet D in order to energize the accumulator reset magnet URM (Fig. 8). The circuit includes line 206, wire 230, contacts D7, wire 253, contacts CC5, magnet URM and line 207. Resetting of the accumulator U occurs at the same time that the selecting bars are being reset.

It is to be understood that during gang punching as explained above, where the number of copies are controlled by a manually set number, there may be an entry of manually set punch data also. This is provided for by plugging between sockets S23 and certain of the sockets S22.

Another form of gang punching control is secured by perforating the pattern card with the number to control the number of copies reproduced. Thus, instead of the pattern card merely containing the data to be punched, it also contains the number to control the quantity of copies. A diagram in Fig. 18 shows this type III form of operation.

With such control it is not necessary to set a number on the wheels 133D; instead the number is automatically entered into accumulator T. In the columns where the lower brushes LB (Fig. 14a) sense the control numbers, plug wire connections are made between sockets S21 and socket S26 in line with adding control magnets AM in accumulator T. Other plug wire connections are made between the sockets S21 at the brushes sensing the punch data and sockets S22 controlling the punch selector bars. In this way the pattern card adjusts the commutator devices in accumulator T, represented at the lower right hand corner of Fig. 14a, at the same time that the punches are selected. The switches remain positioned as in the last form of manual control, explained above, with the exception of switches S5 and S7. Switch S5 is shifted so that the number set up in the commutator devices associated with accumulator T is compared with the number accumulated unit by unit in accumulator U. And switch S7 is shifted to connect a resetting magnet TRM for accumulator T so that this accumulator is reset at the same time as accumulator U.

A typical accumulating circuit may be traced from the lower brushes LB through accumulator T and connections including line 206, wire 230, wire 234, impulse distributor ID, wire 231, common brush 232, roller 233, brush LB, socket S21 and plug wire to socket S26, magnet AM, contacts C3, switch S10 and line 207. The operated accumulator wheels in accumulator T turn brush holders 166' and set them to contact certain commutator segments 167' corresponding to the number added and held in accumulator T.

As cards are gang punched, a unit is added in accumulator U for each operation as explained hereinbefore. A comparison is made between the numbers in accumulators U and T after a unit is entered into U and prior to punching to determine when the required number of cards have been produced. The comparing circuit may be followed along line 206, wires 230, 234 and 242, switch S4, contacts DS8, contacts CC2, wire 243, switch S5, wire 254, contact sector 168', brushes and holder 166', selected segment 167', a wire 240 (Fig. 12) in cable 239, related segment 167 in accumulator U, holder 166, sector 168, wire 245, sector 141, closed switch S5, sector 168' in the tens order of accumulator T; and then back and forth in a similar way through the other orders, the circuit continuing through wire 246 (Fig. 14) magnet D and wire 247 to line 207. The energized magnet D serves, as already explained to interrupt punching and restore the selector bars.

In order to reset accumulator T at the same time as accumulator U, closed switch S7 (Fig. 14a) directs an impulse through resetting magnet TRM corresponding to the reset magnet URM shown in Fig. 8. Thus both accumulators are reset to zero, accumulator T is ready to receive a new control number from the next pattern card, and accumulator U is ready to add a unit for each punched card.

Of course, at any time that certain of the punches are controlled by perforations in the pattern card, other punches may be controlled by the setting of wheels 133. Or all punching may be controlled from either source alone. Thus a pattern card may contain only the number for controlling the number of copies desired while the manually set wheels control the data to be punched.

In another form of control (Fig. 19) a separate number card may contain the number to control the quantity of copies, while an associated pattern card contains the punch data. The two control cards are fed through sensing devices 20 in succession, the number card preceding the pattern card under the lower brushes. Switches S1—7, S12 and S13 are shifted from the position shown in the wiring diagram. Certain of the lower brush sockets S21 are connected directly to punch sockets S22. Other sockets S21 are automatically and alternately connected to sockets S26 in series with the adding magnets AM of accumulator T, and sockets S22 in series with punch set up magnets PM. This is done by a set of contacts 255, 256 having common sockets S27 which may be connected to sockets S21, and alternately selected sockets S28 and S29 which may be plugged to S22 and S26, respectively. The reason why contacts 255, 256 are provided is to use certain lower brushes LB for two purposes, namely, to read a control number on a number card and to read punch data on a pattern card. In other words the same brushes sense punch control data on a pattern card in one cycle, and then on the next cycle they sense number perforations on a number card. The readings are alternately directed into the punch control section and accumulator T. However, once the selector bars are set up, feeding and sensing of the number and pattern cards is suspended until the required number of copies have been made.

Aside from the use of the special number card and the alternate switching of impulses from the lower brushes, the mode of operation is similar to that described hereinbefore with reference to a pattern card carrying both the punch data and the control number. The difference in operation is brought about by the closing of switch S6 and the alternate energization and deenergization of a magnet F which controls contacts 255 and 256. When the first number card of a group passes the upper brushes, it closes contacts UC to complete a circuit through magnet F. The circuit from line 207 includes wire 238, contacts UC, wire 237, wire 257, contacts DS4, switch S6, contacts CC6, wire 258, magnet F and wire 259 to line 206. The energized magnet F attracts associated armatures and closes contacts F1 and 256 and opens contacts F2 and F3. A holding circuit is formed for magnet F through contacts F1. The circuit follows along wire 259, through magnet F, contacts F1, wire 260, contacts FC4 and line 207. The contacts FC4 remain closed as the number card passes under the lower brushes LB. At this time, since the contacts 256 are closed, the reading of the perforations on the number card is entered into accumulator T. This happens as the following pattern card is brought up to the lower brushes. At the end of the number card reading operation the contacts FC4 open and the magnet F is deenergized. Then on the next cycle, since contacts 256 are opened and contacts 255 closed, the reading of the perforation on the pattern card is entered into the punch selector magnets PM. The magnet F remains deenergized during the punching of a number of copies, because at such times the contacts DS4 open and remain opened. It is only when a coincidence is found between the numbers in accumulators U and T that the magnet F is again energized to read a new number card and enter a new number into accumulator T.

The comparison of two like numbers in accumulators U and T cause the energization of magnet D as already explained. This magnet then closes contacts D3 in series with magnet F. When contacts CC6 close a circuit is completed through magnet F over connections including line 206, wire 259, magnet F, wire 258, contacts CC6, switch S6, wire 261, contacts D3 and wire 262 to line 207. Magnet F is held energized by the closing of contacts F1, and then contacts 256 (Fig. 14a) are held closed to direct the new control number read off the next number card into the accumulator T after the resetting of accumulators U and T.

Whenever magnet F is energized it is a sign that a number card is passing through the card sensing unit and at such a time the setting of the punch selector bars and the feeding of blank cards should be suspended until the related pattern card is fed and sensed. It is for this reason that contacts F2 and F3 are opened by magnet F to forestall energization of magnets FPM and SCM.

Another form of control is provided (type V, Fig. 20) wherein the pattern card, in addition to containing perforations representing punch control data, also contains classification perforations which control the number of copies to be reproduced from the pattern. The portion of the pattern card devoted to classification perforations is divided into three sections, each of which may receive a different classification number. Each classification number calls for a different quantity of copies of the pattern card. The machine is prepared for this mode of operation by the operator setting up three different classification numbers on the wheels 133A, 133B, and 133C (Fig. 1).

At the same time the operator sets up other numbers on wheels 133A', 133B', or 133C', which numbers control the number of copies punched and at the same time bear a relationship to the numbers set up on the other three sets of wheels. This relationship is such that when a pattern card contains a number similar to the number set up on wheels 133A, a quantity of copies is punched corresponding to the number set up on the related wheels 133A'. In addition to setting up the six sets of wheels, further preparation is made for this mode of operation by shifting the switches S1—5, S7, S8, S10, S12 and S13. The operations resulting from the shifting of switches S1—5, S7 and S12 are already explained hereinbefore. The differences in the mode of operation are brought about by the closing of switch S8 and the opening of switch S10.

The plug wiring is connected in a different manner because the upper brushes UB are used to sense the classification numbers on the record card. For this reason, certain of the plug sockets S20 are connected by plug wires to the sockets S30A, S30B, S30C (Fig. 14a). Other plug wire connections are made between sockets S31 and S26 to transfer one of the numbers standing on wheels 133A', 133B' or 133C' into the accumulator T. The usual plug connections are made between sockets S21 and S22 to direct the punch selection impulses into the punch control magnets PM.

After the above noted preparations have been made, the start key is depressed and the first pattern card passes under the upper brushes UB. As this is taking place, the classification numbers on the three different portions of the pattern card are compared with the three classification numbers set up on the wheels 133A, 133B, and 133C.

The punching operations are subsequently controlled according to which portion of the pattern card shows a number coinciding with the manual set-up. Assuming that the portion of the card bearing a relationship with wheels 133B is perforated with a number corresponding with the number set up on wheels 133B, the following circuit may be traced: from line 207 (Fig. 14), the circuit follows through wire 263, wire 264 (Fig. 14a), wire 265, contacts K2, wire 266, contacts E2 (closed by the energization of magnet E as soon as the upper card lever contacts UC are closed), wire 267, common brush 268, contact roller 269, upper brushes UB, sockets S20, plug wires to sockets S30B, pick-up magnets BPC, commutator contact sector 141, brush holder 138, contact segment 142, wire 270, emitter segment 146, brush holder 148, contact sector 150 and line 206. The emitter 145 rotates in synchronism with the passage of the pattern card past the upper brushes. The wires 270 leading from the emitter are made effective in succession in accordance with their relationship with the index points on the record card. Thus the segment 142 related to the "9" index point is adapted for energization early in the operation just as the "9" index point on the pattern is passing the upper brushes. If the manually adjustable wheel 133B carrying the brush holder 138 happens to be set to represent "9", a circuit is completed through the commutator devices between the upper brushes and the emitter 145 so that the magnet BPC is energized. In a similar way the other three magnets BPC of the group are energized when coinciding numbers are sensed.

When a magnet BPC is energized, a cooperating pair of contacts 271 and 272 are closed to form holding and controlling circuits for a related magnet BHC. The holding circuit may be traced from line 206, through wire 273, contact 271, magnet BHC, wire 274, contacts FC7, closed as the card passes the upper brushes, wire 275, wire 276, and wires 264 and 263 to the line 207.

The other control circuit, through contacts 272, is effective only when a plurality of such contacts 272 are closed, because they are arranged in series. A plug wire 277 may be connected between the terminal plug SB and any of the other intermediate plugs S32B to eliminate any of the contacts 272. If placed in operation as shown in Fig. 14a, four denominational orders of the numbers manually set up and sensed by the upper brushes must coincide before punch control is rendered effective. The coincidence is manifested by the closing of all four contacts 272 and the formation of a circuit which flows from line 206 (Fig. 14) through contacts FC1 closed after the sensing of the perforations on the pattern card by the upper brushes, wire 278, magnet 2H, wire 279 (Fig. 14a) then through all four of the contacts 272, wire 280, contacts FC8 closed after the sensing of classification perforations, wires 276, 264, and 263 to line 207. The energized magnet 2H closes a series of contacts 2H1, 2H7, 2H8 and 2H5 and opens contacts 2H2. The closing of contacts 2H1 forms a holding circuit through the magnet 2H. The circuit may be followed from line 206 (Fig. 14) through contacts FC1 held closed throughout the passage of the pattern card under the lower brushes, wire 278, magnet 2H, contacts 2H1, wire 281, wire 262 and line 207.

Figure 13:
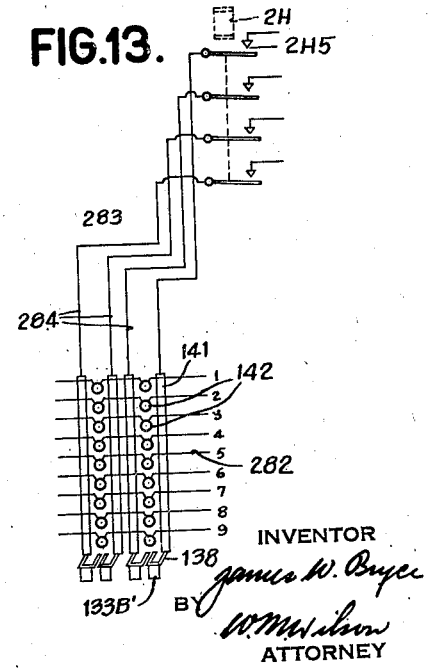
Fig. 13 is an enlarged portion of the wiring diagram showing the connections between manually adjusted commutator devices and contacts closed under comparing control.

The contacts 2H5 (Fig. 14a) closed by magnet 2H direct the numbers set up on wheels 133B' into accumulator T. The contacts act as a connection between the emitter 145, the commutator devices set up by wheels 133B', and the adding magnets of accumulator T. A typical circuit may be traced in Fig. 14a from line 206, through emitter 145, wire 270, wire 282, contact segment 142 in the commutators adjusted by wheel 133B', brush holder 138, contact segment 141, cable 283 comprising a series of wires 284, as shown in Fig. 13, contacts 2H5, wire 285, plug socket S31, plug wire to socket S26, adding magnet AM, contacts 80, contacts C3, contacts DS7 and line 207. The number thus entered into accumulator T is later compared with the number accumulated unit by unit in accumulator U, as explained hereinbefore. The comparing operation is continued until a coincidence is reached and magnet D is energized to interrupt the feeding and punching of the blank cards until the selector bars are restored and set up with new data and the accumulator T is set to represent a new control number.

While the machine is operating to test the classification numbers on the pattern cards and compare them with the numbers set up by the operator, the blank cards are prevented from being fed and punched. This is brought about by the energization of a magnet J and the operating of contacts J2 and J3 in series with the clutch magnet SCM and FPM, respectively, controlling the adjustment of the punch selector bars and the feeding and punching of the blank cards. When the classification number of a pattern coincides with the number set up by the operator, the magnet 2H is energized as already explained and cooperating contacts 2H2 are open to de-energize magnet J to allow the closing of contacts J2 and J3, to permit the resumption of card feeding and punching operations.

The circuit through magnet J may be followed along line 206 (Fig. 14), wire 286, magnet J, contacts 3H2, contacts 2H2, contacts 1H2, wire 287, contacts DS6, contacts FC2, contacts D6, contacts C5, wire 288, switch S8 and line 207. The energized magnet J closes contacts J1 to form a holding circuit. The holding circuit through magnet J may be followed along line 206, wire 286, magnet J, contacts J1, wire 289, contacts FC5 and line 207.

The pattern cards are fed continuously until a classification agreement is reached. In order to keep the card feed operating, magnet CFM is energized through the closed contacts DS2 which remain closed until magnet SCM is operated, and through contacts B1, C1 and contacts CR2 closed near the end of each card reading operation. As soon as a comparison is reached, contacts DS2 are opened to deenergize CFM as the selector bars are set up after the tripping of clutch magnet SCM. Thus, pattern card feeding is suspended while the required number of cards are punched.

The example taken hereinbefore assumes that the coinciding classification number occurs in the portion of the pattern card corresponding to the set of wheels 133B. In a similar way other coinciding classification numbers may be read from portions of the record related to the sets of wheels 133A and 133C. The same sort of operation will follow, the only difference being, instead of magnet 2H being energized, either magnet 3H or 1H would be effective and the result would be that the numbers set up in wheels 133A' or wheels 133C' would be entered into accumulator T to control the number of copies punched under control of a reading of the pattern card or the reading of the manually set punch control wheels 133.

Throughout the operation outlined above, the pattern card is fed under the upper brushes for sensing the classification numbers, and then one cycle later is fed under the lower brushes for sensing punch control data appearing thereon. None of the pattern cards is effective until a control number is set up in the accumulator T, then the punch selector bars are set under control of the readings of the lower brushes and feeding of pattern cards is interrupted until the numbers in accumulator T and accumulator U coincide. Then feeding of pattern cards is resumed until a classification number is found to coincide with a manual setting and another copy control number is set up in accumulator T. After the punch selector bars are set, the blank detail cards are fed and punched while the accumulator U counts the number of cards punched. The punching operation continues until the number added in accumulator U matches with the number in accumulator T. Then reproducing is interrupted for the sensing of a new pattern card for further control of gang punching.

In some forms of classification control, only one classification number, rather than a plurality of such numbers, may appear on a pattern card. It may be desired to compare this one number with all three manually set classification numbers so that agreement with any one will select a related copy number. Provision is made for this form of control by the extra sockets in plug terminals S30A, (Fig. 14a). Multiple or parallel connections may be made through comparing magnets BPC and CPC by connecting plug wires from S30A to sockets S30B and S30C in each of the related orders. Thus a single connection from the upper brushes UB and socket S20 to socket S30A is arranged to branch out and compare in all three banks.

Once the plug connections are made, the operation is the same as that explained hereinbefore, there being a gain in selectivity with the use of a smaller portion of the pattern for class data. It is apparent that other combinations of plugging may be arranged whereby one classification number on a pattern may be compared with two set up classification numbers, at the same time that another punched classification number on the pattern is compared with a third manually set classification number. These separate punched class numbers may be compared with a single set up digit by running three plug wires from sockets S20 to a single socket S30A.

The machine is provided with means for operating under control of a modified form of the type of operation last discussed. This modified control employs a separate number card to carry the classification perforations. A diagrammatic showing of this type VI form of operation is disclosed in Fig. 21. With such control only the number card is read by the upper brushes and the pattern card is read by the lower brushes. Each number card accompanies a related pattern card and is fed before it in passing through the machine.

Preparations are made for this modified type of control by plugging between sockets S20 and sockets S30 so that the readings of the classification perforations on the number card may be directed through the upper brushes UB and compared with the numbers set up in the commutators associated with wheels 133A, 133B and 133C. Plug connections are also made between sockets S31 and S26 so that the selected reading of the numbers set up in wheels 133A', 133B' or 133C' may be directed into accumulator T.

In addition to the shifting of switches S1—S5, S7, S8, S10, S12 and S13, switches S6, S9 and S11 are shifted to secure number card control of the quantity of copies punched. Switch S9 calls in magnet F to prevent the immediate feeding and punching of blank cards under certain conditions when classification comparison is made. This same switch calls in magnets 1L, 2L and 3L to sustain the energization of magnets 1H, 2H or 3H until a selected copy control number is added in accumulator T. Switch S9 also adapts magnet K to disable the upper brushes UB after a classification number card is sensed. Switch S11, when shifted, makes a magnet M effective in conjunction with magnet J to prevent blank card feeding and punching while ineffective classification number cards and their associated pattern cards are passing through the machine.

As a classification number card passes under the upper brushes UB the plurality of classification numbers appearing thereon are compared with the settings of wheels 133A, 133B and 133C. Assuming again that a coincidence is found with the number on wheels 133B, circuits are completed through the emitter 145 (Fig. 14a), commutators 142, 141 associated with wheels 133B, magnets BPC and the upper brushes. The contacts 272 are closed and held in such condition by the holding coils BHC. Control relay 2H (Fig. 14) is energized through the described connections in series with contacts 272. Contacts 2H1, 2H2, 2H7, 2H8 and 2H5 are then operated to effect control in various sections of the machine. Contacts 2H5 when closed connect the commutators associated with wheels 133B' with the adding magnets AM of accumulator T to enter therein the number for controlling the number of copies to be punched as already described. Contacts 2H1 form a holding circuit for relay magnet 2H. Contacts 2H2 open to deenergize magnet J so that blank card feeding and punching is resumed after being interrupted while setting up new data.

In order to keep the selected magnet 2H energized after the number card passes the upper brushes and until the related pattern card gets to the lower brushes, a magnet 2L is provided to reenergize magnet 2H and hold contacts 2H5 shifted until the selected copy control number is transferred from wheels 133B' into accumulator T. Magnet 2L is energized by the closing of contacts FC3 shortly before magnet 2H is deenergized by the opening of contacts FC1. The circuit includes line 206, magnet 2L, wire 298, contacts 2H7, wire 299, contacts FC3, wire 296, switch S9 and line 207. A holding circuit is established by the closure of contacts 2L1 through magnet 2L, contacts 2L1, wire 300, wire 297 (Fig. 14a), contacts FC6, wires 264 and 263 to line 207. Contacts FC6 remain closed as the pattern card is passing the upper brushes. The energized magnet 2L attracts other contacts 2L2 and closes them to prepare for a circuit to reenergize magnet 2H at the end of the cycle after the pattern card has passed the upper brushes and when contacts FC1 and FC9 close. The circuit through contacts 2L2 includes line 206, contacts FC1, wire 278, magnet 2H, wire 279, wire 301, contacts 2L2, wire 302, contacts FC9 and wire 263 to line 207. Thus magnet 2H holds the contacts 2H5 closed while the impulses from emitter 145 go through the commutator devices with wheels 133B' and into accumulator T.

While the machine is going through idle sensing operations without any classification agreement, the contacts DS7 are opened and action of emitter 145 is ineffective. However, before the cycle that the selector bars are set up and the pattern card passes under the lower brushes, magnet SCM is energized and the DS cams revolve to close contacts DS7.

Once the control number is added in accumulator T the comparing operation between accumulators U and T takes place on every operation when contacts CC2 close after the entry of a unit into accumulator U by the closing of contacts CC1. The resulting energization of magnet D serves in the usual way to interrupt blank card feeding and resume number and pattern card feeding until a new setting is made on the selector bars.

Although up to this point it is assumed that magnet 2H is the controlling magnet, it is apparent that two other similar control devices are provided and that either magnet 3H or 1H may control in a similar way should classification numbers be sensed agreeing with the numbers set up in wheels 133A and 133C. Magnets 1L and 1L function in a manner similar to the action of magnet 2L in sustaining magnets 3H and 1H.

If the classification numbers on the number cards fail to agree with the numbers set up, the feeding of the number cards and the associated pattern cards is maintained until an agreement is reached. The maintenance of number and pattern card feeding without an accompanying blank card feeding is brought about by the successive energization of magnets J and M, and the sustained effectiveness of the card feed clutch magnet CFM. As long as no agreement is reached, magnets 1H, 2H and 3H are deenergized and contacts 1H2, 2H2 and 3H2 remain closed in line with magnets J and M. The closing of switch S11 connects magnet M into the circuits associated with magnet J. Both magnets J and M have contacts in series with magnets FPM and SCM so that the clutches controlled thereby are held ineffective and the selector bars and the blank cards do not move until a classification number agreement is reached. Meanwhile the contacts DS2 remain closed and contacts CR2 close near the end of each cycle to reenergize magnet CFM for the continued feeding of number and pattern cards.

Magnet M is energized at the midpoint of the operation when the pattern card is about to pass the upper brushes. The circuit is completed at this time by the closing of contacts FC10. The connections include line 206, wire 294, magnet M, contacts FC10, switch S11, contacts 3H2, 2H2, and 1H2, wire 287, contacts DS6, FC2, D6 and C5 wire 288 and switch S8 to line 207. The energized magnet M then acts on contacts M2 and M3 to open them and prevent circuits through magnet SCM and FPM at the time that J2 and J3 are allowed to close by deenergized magnet J. As the pattern card is about to pass under the lower brushes, contacts FC2 are again closed and magnet J is energized to open contacts J2 and J3. The alternate energization of magnets J and M continues until a contact 3H2, 2H2 or 1H2 is opened by the reading of an agreeing classification number.

Provision is made to prevent the feeding of blank cards at times when there is a failure of classification comparison after a fixed number of blank cards have been fed. When the required number of copies are punched, magnet D is energized and if none of the contacts 3H2, 2H2, 1H2 is open, the closing of contacts D4 directs a circuit through the magnet J to open contacts J2 and J3 to prevent a setting of the selector bars and feeding of blank cards. The circuit includes a wire 286, magnet J, contacts 3H2, 2H2, 1H2, wire 287, contacts DS5, contacts D4, C5, wire 288 and switch S8.

Whenever a pattern card passes the upper brushes UB, these brushes are disconnected to avoid sensing any data other than the classification data on the number card. The disconnection is brought about by the opening of contacts K2 under control of a magnet K which in turn is energized by the closing of contacts J4 (Fig. 14a) by magnet J. Magnet J is energized as the number card passes the lower brushes, providing that no agreeing classification number was found thereon as it passed the upper brushes.

The circuit through magnet K includes line 206, magnet K, wire 290, contacts J4, wire 291, wire 292 (Fig. 14), contacts FC3 closed before the pattern card passes the upper brushes, wire 296, switch S9 and line 207. Magnet K attracts and closes contacts K1 to form a holding circuit through wire 297, contacts FC6 held closed while the pattern passes the upper brushes, wires 264 and 263 to line 207. Magnet K also opens contacts K2 to break the connections through wires 265 and 266 to the upper brushes UB.

When a classification comparison is reached after a number of idle strokes it is desired that the magnets FPM and SCM remain deenergized so that feeding of blank cards is held up until the number card is fed past the lower brushes and the related pattern card is brought up to the lower brushes. At such a time magnets J and M are ineffective because of the open contacts 3H2, 2H2 or 1H2. For this reason the magnet F is energized to open contacts F2 and F3 when any contacts 3H8, 2H8 or 1H8 are closed by an associated magnet H as a classification agreement is reached. The energizing circuit through magnet F may be traced from line 207 through closed switch S9, contacts DS9, contacts FC12, wire 292, contacts 2H8, wire 293, magnet F and wire 259 to line 206. Magnet F then closes contacts F1 to form a holding circuit including wires 259 and 260 and contacts FC4 held closed as the first effective number card passes the lower brushes LB. Contacts F2 and F3 are held opened by magnet F, thus preventing energization of magnets SCM and FPM until the following pattern card is about to go past the lower brushes LB. The contacts F4 (Fig. 14a) are also operated by magnet F to close and energize magnet K which then opens contacts K2 so that the pattern is not sensed by the upper brushes.

If a classification agreement is found during the starting cycles, magnet F is energized by the closing of contacts CC6 and serves to hold up blank card feeding and the selector bar setup until the first number card is past the lower brushes. The circuit includes line 206, wire 259, magnet F, wire 258, contacts CC6, switch S6, contacts DS4, wire 257, wire 237, contacts UC and wire 238 to line 207.

Magnet F is also energized through other connections when there is a copy control number agreement between accumulators U and T. At such a time, magnet D is energized and contacts D3 are closed. When contacts CC6 close on the last punching operation, a circuit is directed through magnet F along wire 258, contacts CC6, switch S6, wire 261, contacts D3 and wire 262. Magnet F then holds contacts F2 and F3 opened preventing blank card feeding and selector bar setting until the new number card is fed past the lower brushes and the new pattern card is brought up to the lower brushes.

In the type of operation outlined, the number card is fed under the upper brushes and there sensed for classification numbers which are compared with a plurality of previously selected classification control numbers. Should a coinciding number be sensed, a related punch control number determining the number of copies to be punched is entered into the accumulator T. The number card is followed by a companion pattern card which carries the punch control data. This card is sensed by the lower brushes and punch selector bars are set in accordance with the sensing. Then as the blank cards are punched, the accumulator U is operated to keep count of the number of cards. The number in accumulator U is compared with the number in accumulator T after every punching operation. When the two numbers agree it is a sign that the required number of cards have been produced and blank card feeding and punching is interrupted while other number and pattern cards are fed until another punch control setting is automatically made.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a record reproducing machine, commutator devices adapted to be manually adjusted to represent data to be reproduced on the records, other commutator devices adapted to be manually adjusted to set up a number for controlling the number of records produced, means under control of the first mentioned commutator devices for recording the data on the records, an accumulator for counting the number of records produced, means for comparing the number set up in said other commutator devices with the number accumulated, and means under control of said comparing means for stopping the operation of said recording means when the required number of records are produced.

2. In a record reproducing machine controlled by pattern cards containing data to be reproduced, means for sensing the data on a pattern card, means under control of said sensing means for recording the data on the records, manually adjusted commutator devices for setting up data to be recorded, an emitter for directing timed impulses through said devices, means under control of said impulses for recording the manually set data on the records, other manually adjusted commutator devices for setting up a number to control the number of record copies produced, an accumulator, means for operating said accumulator to add a unit each time a record is produced, means for comparing the number set up in said other commutator devices with the number added in said accumulator, and means under control of said comparing means for stopping said recording means after the required number of records have been produced.

3. In a record reproducing machine controlled by pattern records containing data to be reproduced and a control number for determining the number of record copies reproduced, means for sensing the data and control number on a pattern record, means under control of said sensing means for reproducing record copies of the pattern, and other means under control of said sensing means and set with said control number for controlling the number of record copies produced.

4. In a record perforating machine controlled by pattern cards perforated with data to be reproduced and control number perforations for determining the number of record copies reproduced, means for sensing the perforations in a pattern card, means under control of said sensing means for perforating records reproducing data on the pattern, an accumulator, means for operating the accumulator to count the number of records reproduced, means for comparing the number added in the accumulator with the control number on the pattern, and means under control of said comparing means for interrupting the operation of said perforating means when both numbers agree.

5. In a record reproducing machine controlled by pattern records containing data to be reproduced and a control number for determining the number of record copies reproduced, means for sensing the data and control number on a pattern, an accumulator, means under control of said sensing means for adding the control number in said accumulator, means under control of said sensing means for reproducing record copies of the pattern, a second accumulator, means for operating said second accumulator to count the number of record copies reproduced, means for comparing the numbers in both accumulators, and means under control of said comparing means for stopping reproducing after the required number of record copies are made.

6. In a record reproducing machine controlled by pattern records containing data to be reproduced and a control number for determining the number of record copies reproduced, means for sensing the data and control number on a pattern, means under control of said sensing means for reproducing record copies of the pattern, an accumulator, means for operating said accumulator to count the number of record copies reproduced, manually adjusted means for setting up a control number to control the number of record copies reproduced, means for selectively comparing either the control number on the pattern card or the control number in the manually adjusted means with the number added in said accumulator, and means under control of said comparing means for indicating when the selected number of record copies have been reproduced.

7. In a record perforating machine controlled by pattern cards perforated with data to be reproduced and control number perforations for determining the number of record copies reproduced, means for sensing the perforations in a pattern card, means under control of said sensing means for perforating records reproducing data on the pattern, manually adjusted commutator devices adapted to be set to represent additional data, an emitter for directing controlling impulses through said commutator devices and into said perforating means to perforate said records with said additional data, an accumulator, means for operating said accumulator to count the number of records reproduced, a second set of commutator devices adapted to be adjusted by said accumulator, a third set of commutator devices adapted to be adjusted under control of said sensing means to represent said control number, means for comparing the settings of said second and said third sets of commutator devices, and means under control of said comparing means for stopping said perforating means when the required number of record copies have been perforated.

8. In a record reproducing machine controlled by pattern records containing the data to be reproduced and number records containing a control number for determining the number of copies reproduced, means for sensing the data on a pattern record and the number on a number record, means under control of said sensing means for reproducing copies of said pattern record, an accumulator for counting the number of copies reproduced, means under control of said sensing means for comparing the number on said number record with the number in said accumulator and means under control of said comparing means for automatically stopping said reproducing means when the required number of record copies have been produced.

9. In a record perforating machine controlled by pattern cards containing perforated data to be reproduced and number cards containing control number perforations for determining the number of copies reproduced from each pattern card, there being one number card associated with each pattern card, means for sensing the perforations in a pattern card and an associated number card, means under control of said sensing means for perforating record copies of said pattern card, an accumulator for counting the number of copies perforated, a second accumulator, means under control of said sensing means for operating said second accumulator to add the control number, means for comparing the numbers in the two accumulators, and means under control of said comparing means for stopping the perforating means when the numbers are similar in both accumulators.

10. In a record reproducing machine controlled by pattern cards containing data to be reproduced and number cards containing a control number to control the number of record copies produced, means for sensing the data on a pattern card and the number on a number card, means under control of said sensing means for reproducing record copies of said pattern card, an accumulator, means for operating said accumulator to count the number of record copies reproduced, manually adjusted devices for setting up a control number, means for selectively comparing either the number sensed on said number card or the manually set number with the number in said accumulator, and means under control of said comparing means for interrupting the operation of said reproducing means when the selected number of record copies are made.

11. In a record perforating machine controlled by pattern cards containing perforated data to be reproduced and number cards containing control number perforations for determining the number of record copies reproduced from each pattern card, there being a number card for each pattern card, means for sensing the perforations in a pattern card and an associated number card, means under control of said sensing means for perforating copies of said pattern card, manually adjusted commutator devices for setting up additional data, an emitter for directing timed impulses through said devices and into said perforating means to control the perforation of said additional data in the copies, an accumulator, means for operating said accumulator to count the number of copies perforated, a second set of commutators associated with said accumulator and adjusted thereby to represent the counted number, a third set of commutators, means under control of said sensing means for adjusting said third set of commutators to represent the control number, means for comparing the settings of said second and said third sets of commutators, and means under control of said comparing means for stopping the perforating means when the settings of the second and third sets of commutators agree.

12. In a record controlled machine with control records carrying classification numbers, a main operating means, means for setting up a classification number and a related control number, means for sensing the classification numbers on said records and comparing them with the selected classification number, and means operated under the control of said comparing means when classification agreement is reached for limiting the number of cycles of operation of said main operating means to correspond to the selected control number.

13. In a record controlled machine with control records carrying a plurality of classification numbers, a main operating means, means for setting up a plurality of classification numbers and a plurality of control numbers, each control number being associated with one of said classification numbers, means for sensing the classification numbers on the records and comparing them with the set up classification numbers, means under control of said comparing means for selecting a control number when the related classification number agrees with one of the classification numbers on a record, and means under control of said settable means for controlling the number of operations of said operating means to agree with the selected control number.

14. In a record reproducing machine controlled by a pattern record containing data to be reproduced and a classification number for selecting the number of record copies to be produced, means for sensing the data and number on a pattern record, means under control of said sensing means for reproducing record copies of the pattern, means for setting up a plurality of control numbers related to various classifications of patterns, means for selecting the control number related to the classification number on the pattern, and means under control of the settable means with the selected control number for controlling the number of record copies produced.

15. In a record reproducing machine controlled by a pattern record containing data to be reproduced and a classification number for selecting a control number, means for setting up a plurality of classification numbers and a series of control numbers one for each classification number, means for sensing the pattern record, means under control of said sensing means for reproducing record copies of the pattern, means for comparing the classification numbers of the pattern with the set up classification numbers, means under control of said comparing means for selecting a control number, an accumulator, means for operating said accumulator to count the number of record copies produced, means for comparing the selected control number with the number in said accumulator, and means under control of the last mentioned comparing means for stopping the reproducing means when the selected number of record copies have been made.

16. In a record reproducing machine controlled by a pattern record containing data to be reproduced and a classification number for selecting the number of record copies to be produced, means for setting up a plurality of classification numbers and a plurality of control numbers one for each classification number, means for sensing the pattern record, means under control of said sensing means for reproducing record copies of the pattern, means for comparing the classification number of the pattern with the classification numbers set up, means under control of said comparing means for selecting a control number, an accumulator, means for entering the selected control number into said accumulator, a second accumulator; means for operating said second accumulator to count the number of record copies produced, means for comparing the numbers in the accumulators, and means under control of said last mentioned comparing means for stopping the reproducing means when the numbers in both accumulators are alike.

17. In a record perforating machine controlled by a pattern card perforated with data to be reproduced and classification perforations for selecting the number of records to be perforated, commutator devices settable to represent a plurality of classification numbers and a plurality of control numbers one for each classification number, means for sensing the classification number on the pattern, an emitter driven in synchronism with said sensing means and connected to said commutators, a comparing means operated by impulses from said emitter when the classification number on the pattern agrees with a set classification number, an accumulator, means under control of said comparing means for selecting certain control number commutators and directing emitted impulses therefrom into said accumulator to cause the same to add the control number, means for sensing the data on the pattern, means under control of the last mentioned sensing means for perforating copies of said pattern, a second accumulator, means for operating said second accumulator to count the number of copies perforated, commutator devices adjusted by said second accumulator, other commutator devices adjusted by the first mentioned accumulator, means for comparing the settings of the two last mentioned commutator devices, and means under control of the last mentioned comparing means for stopping said perforating means after the selected number of copies have been perforated.

18. In a record reproducing machine controlled by a pattern record containing data to be reproduced and a number record containing a classification number for selecting the number of record copies to be produced, means for sensing data on the pattern record, means under control of said sensing means for reproducing record copies of the pattern, means for setting up a plurality of control numbers relating to various classifications, means for sensing the classification number on said number card, means under control of the last mentioned sensing means for selecting the control number related to the classification number on the number record and means under control of the settable means with the selected control number for controlling the number of record copies produced.

19. In a record producing machine controlled by a pattern record containing data to be reproduced and a number record containing a classification number for selecting a reproduction control number, means for setting up a plurality of classification numbers and a series of control numbers, one for each classification number, means for sensing the pattern record, means under control of said sensing means for reproducing record copies of the pattern, means for sensing a number record, means under control of said last mentioned sensing means for comparing the classification number of the pattern with the classification numbers set up, means under control of said comparing means for selecting a certain reproduction control number, an accumulator, means for operating said accumulator to count the number of record copies produced, means for comparing the selected control number with the number in said accumulator, and means under control of the last mentioned comparing means for stopping the reproducing means when the selected number of record copies have been made.

20. In a record reproducing machine controlled by a pattern record containing data to be reproduced and an associated number record containing a classification number for selecting the number of record copies to be produced, means for setting up a plurality of classification numbers and a plurality of reproduction control numbers, one for each classification number, means for sensing the pattern record, means under control of said sensing means for reproducing record copies of the pattern, means for sensing said number record, means under control of the last mentioned sensing means for comparing the classification of the pattern with the classification numbers set up, means under control of said comparing means for selecting a certain reproduction control number, an accumulator, means for entering the selected control number into said accumulator, a second accumulator, means for operating said second accumulator to count the number of record copies produced, means for comparing the numbers in the accumulators, and means under control of said last mentioned comparing means for stopping the reproducing means when the numbers in both accumulators are alike.

21. In a record perforating machine controlled by a pattern card perforated with data to be reproduced and an associated number card with classification perforations for selecting the number of records to be copied from the pattern, commutator devices settable to represent a plurality of classification numbers and a corresponding plurality of reproduction control numbers, one for each classification number, means for sensing the classification number on the number card, an emitter driven in synchronism with said sensing means and connected to said commutator devices, a comparing means operated by impulses from said emitter when the classification number on the number card agrees with a set classification number, an accumulator, means under control of said comparing means for selecting certain control number commutator devices and directing emitted impulses therethrough into said accumulator to cause the same to add the reproduction control number, means for sensing the data on the pattern, means under control of the last mentioned sensing means for perforating copies of said pattern, a second accumulator, means for operating said second accumulator to count the number of copies perforated, commutator devices adjusted by said second accumulator, other commutator devices adjusted by the first mentioned accumulator, means for comparing the settings of the two last mentioned commutator devices, and means under control of the last mentioned comparing means for stopping said perforating means after the selected number of copies have been perforated.

22. In a record producing machine controlled by record cards containing control numbers for determining the number of records made, means for producing records, means for sensing the number on one of said cards, means under control of said sensing means for interrupting said record producing means after the required number of records have been made, and means under control of said interrupting means for automatically feeding another of said record cards into cooperation with said sensing means to limit the number of records made in the next group of records.

23. In a record producing machine controlled by a record card containing a control number for limiting the number of records made, means for manually setting up data to be reproduced on the records, means under control of said manual means for producing records, means for sensing the control number on said card, and means under control of said sensing means for stopping said record producing means after the required number of records are produced.

24. In a record reproducing machine controlled by a pattern card containing data to be reproduced and a copy control number for limiting the number of record copies produced, means for manually setting up data to be reproduced, means for sensing the data on the pattern card, means under control of said manual means and said sensing means for reproducing records, means for sensing said copy control number on said pattern, and means under control of the last mentioned sensing means for controlling the number of times said reproducing means operates to make a record.

25. In a record reproducing machine controlled by pattern records containing copy control numbers, means for sensing a pattern for data to be reproduced, means for manually setting data to be reproduced, means under selective control of either or both of said means for reproducing records, devices for manually setting up a copy control number to control the number of records reproduced, devices for sensing a copy control number on a pattern record, means for selecting either of said devices for copy control, and means under control of the selected device for stopping said reproducing means after the selected number of record copies are produced.

26. In a record reproducing machine controlled by pattern records and number records containing copy control numbers, means for sensing a pattern for data to be reproduced, means for manually setting data to be reproduced, means under selective control of either or both said means for reproducing records, devices for manually setting up a copy control number to control the number of records reproduced, devices for sensing a copy control number on a number record, means for selecting either of said devices for copy control, and means under control of the selected device for stopping said reproducing means after the required number of records are produced.

27. In a record producing machine controlled by pattern records, means for sensing data on a pattern, means for manually setting data to be reproduced, means under selective control of either or both of said means for reproducing records, devices for manually setting up copy control numbers to control the number of records reproduced, devices for sensing the classification of a pattern record and thereby selecting a related one of said manually set copy control numbers, means for selecting either of said devices for copy control, and means under control of the selected device for stopping said reproducing means after the selected number of record copies are produced.

28. In a record reproducing machine controlled by pattern records and number records, means for sensing a pattern for data to be reproduced, means for manually setting data to be reproduced, means under selective control of either or both of said means for reproducing records, devices for manually setting up copy control numbers to control the number of records reproduced, devices for sensing the classification of a number record and thereby selecting a related one of said manually set control numbers, means for selecting either of said devices for copy control and means under control of the selected device for stopping said reproducing means after the selected number of record copies are reproduced.

29. In a record reproducing machine controlled by pattern records containing copy control numbers and number records containing copy control numbers, means for sensing a pattern for data to be reproduced, means for manually setting data to be reproduced, means under selective control of either or both of said means for reproducing records, devices for sensing a copy control number on a pattern, devices for sensing a copy control number on a number record, means for selecting either of said devices for copy control and means under control of the selected device for stopping said reproducing means after the selected number of record copies are produced.

30. In a record reproducing machine controlled by pattern records, means for sensing a pattern for data to be reproduced, means for manually setting up data to be reproduced, means under selective control of either or both of said means for reproducing records, means for manually setting up copy control numbers, devices for sensing a copy control number on a pattern record, a device for sensing the classification of a pattern and thereby selecting a related one of said manually set control numbers, means for selecting either of said devices for copy control, and means under control of the selected device for limiting the number of record copies produced.

31. In a record reproducing machine controlled by pattern records and number records, means for sensing a pattern for data to be reproduced, means for manually setting data to be reproduced, means under selective control of either or both of said means for reproducing records, means for manually setting up copy control numbers to control the number of records reproduced, devices for sensing a copy control number on a number record, devices for sensing the classification of a number record and thereby selecting a related one of said manually set control numbers, means for selecting either of said devices for copy control, and means under control of the selected device for limiting the number of record copies produced.

32. In a record reproducing machine controlled by pattern records and number records, means for sensing a pattern for data to be reproduced, means for manually setting data to be reproduced, means under selective control of either or both of said means for reproducing records, means for manually setting up copy control numbers to control the number of records reproduced, devices for sensing a copy control number on a number record, devices for sensing the classification of a pattern and thereby selecting a related one of said manually set control numbers, means for selecting any of said devices for copy control and means under control of the selected device for stopping said reproducing means after the selected number of record copies are produced.

33. In a record reproducing machine controlled by pattern records and number records, means for sensing a pattern for data to be reproduced, means for manually setting data to be reproduced, means under selective control of either or both of said means for reproducing records, means for manually setting up copy control numbers to control the number of records reproduced, devices for sensing a copy control number on a number record, devices for sensing the classification of a number record and thereby selecting a related one of said manually set control numbers, means for selecting either of said devices for copy control and means under control of a selected device for limiting the number of record copies produced.

34. In a record reproducing machine controlled by pattern records and number records, means for sensing a pattern for data to be reproduced, means for manually setting data to be reproduced, means under selective control of either or both of said means for reproducing records, means for manually setting up copy control numbers to control the number of records reproduced, devices for sensing the classification of a pattern and thereby selecting a related one of said manually set control numbers, devices for sensing the classification of a number record and thereby selecting a related one of said manually set control numbers, means for selecting either of said devices for copy control, and means under control of the selected devices for limiting the number of record copies produced.

35. In a record reproducing machine controlled by pattern records and number records, means for sensing a pattern for data to be reproduced, means for manually setting data to be reproduced, means under selected control of either or both of said means for reproducing records, devices for manually setting up copy control numbers to control the number of records produced, devices for sensing a copy control number on a pattern, devices for sensing a copy control number on a number record, means for selecting any of said devices for copying control and means under control of the selected device for stopping the reproducing means after the selected number of record copies are produced.

36. In a record reproducing machine controlled by pattern records and number records, means for sensing a pattern for data to be reproduced, means for manually setting data to be reproduced, means under selective control of either or both of said means for reproducing records, devices for manually setting up copy control numbers to control the number of records reproduced, devices for sensing a copy control number on a number record, devices for sensing the classification of a pattern and thereby selecting a related one of said manually set control numbers, means for selecting any of said devices for copy control, and means under control of the selected device for stopping said reproducing means after the selected number of record copies are produced.

37. In a record reproducing machine controlled by pattern records and number records, means for sensing a pattern for data to be reproduced, means for manually setting data to be reproduced, means under selective control of either or both of said means for reproducing records, devices for manually setting up copy control numbers to control the number of records reproduced, devices for sensing the classification of a pattern and thereby selecting a related one of said manually set control numbers, devices for sensing the classification of a number record and thereby selecting a related one of said manually set control numbers, means for selecting any of said devices for copy control, and means under control of the selected device for limiting the number of record copies produced.

38. In a record reproducing machine controlled by pattern records and number records, means for sensing a pattern for data to be reproduced, means for manually setting data to be reproduced, means under selective control of either or both of said means for reproducing records, devices for manually setting up copy control numbers to control the number of records reproduced, devices for sensing a copy control number on a pattern, devices for sensing a copy control number on a number record, devices for sensing the classification of a pattern and thereby selecting a related one of said manually set control numbers, means for selecting any of said devices for copy control, and means under control of the selected device for limiting the number of record copies produced.

39. In a record reproducing machine controlled by pattern records and number records, means for sensing a pattern for data to be reproduced, means for manually setting data to be reproduced, means under selected control of either or both of said means for reproducing records, devices for manually setting up copy control numbers to control the number of records reproduced, devices for sensing a copy control number on a pattern, devices for sensing the classification of a pattern and thereby selecting a related one of said manually set control numbers, devices for sensing the classification of a number record and thereby selecting a related one of said manually set control numbers, means for selecting any of said devices for copy control, and means under control of the selected device for stopping said reproducing means after the selected number of record copies are produced.

40. In a record reproducing machine controlled by pattern records and number records, means for sensing a pattern for data to be reproduced, means for manually setting data to be reproduced, means under selective control of either or both of said means for reproducing records, devices for manually setting up copy control numbers to control the number of records reproduced, devices for sensing a copy control number of a number record, devices for sensing the classification of a pattern and thereby selecting a related one of said manually set control numbers, devices for sensing the classification of a number record and thereby selecting a related one of said manually set control numbers, means for selecting any of said devices for copy control and means under control of the selected device for limiting the number of record copies produced.

41. In a record reproducing machine controlled by pattern records and number records, means for sensing a pattern for data to be reproduced, means for manually setting data to be reproduced, means under selective control of either or both of said means for reproducing records, devices for manually setting up copy control numbers to control the number of records reproduced, devices for sensing a copy control number on a pattern, devices for sensing a copy control number on a number record, devices for sensing the classification of a pattern and thereby selecting a related one of said manually set control numbers, devices for sensing the classification of a number record and thereby selecting a related one of said manually set control numbers, means for selecting any of said devices for copy control, and means under control of the selected device for stopping said reproducing means after the selected number of record copies are produced.

42. In a record reproducing machine controlled by a record carrying a classification number, means for setting up data to be reproduced, means under control of said settable means for reproducing record copies of the data, means for setting up a plurality of classification numbers and a plurality of copy control numbers, each control number being associated with one of said set up classification numbers, means for sensing the classification number on the record and comparing it with all of the set up classification numbers, means under control of said comparing means for selecting a control number when the related classification number agrees with the classification number on the record, and means under control of said settable means for limiting the operation of said reproducing means to limit the number of record copies produced in accordance with the selected control number.

43. In a record reproducing machine controlled by a record carrying a plurality of classification numbers, means for setting up data to be reproduced, means under control of said settable means for reproducing record copies of the data, means for setting up a classification number and a related copy control number, means for sensing the plurality of classification numbers on the record and comparing them with the set up classification number, means under control of said comparing means for selecting the copy control number and starting said reproducing means when any of the classification numbers on the record agrees with the set classification number, and means under control of said settable means for controlling the operation of said reproducing means to produce a number of records equal to the copy control number.

44. In a record reproducing machine controlled by pattern records containing data to be reproduced and a control number for determining the number of record copies reproduced, means for sensing the data and control number on a pattern record, means for feeding said pattern records in succession into cooperation with said sensing means, means under control of said sensing means for reproducing record copies of the pattern, means for stopping said feeding means during reproduction, means under control of said sensing means and set with said control number for stopping said reproducing means after the selected number of copies are produced, and means under control of the last mentioned means for resuming operation of said feeding means.

45. In a record reproducing machine controlled by number records containing control numbers for determining the number of copies to be reproduced and associated pattern records containing data to be reproduced, a common sensing means for alternately sensing numbers on number records and data on pattern records, means under control of said sensing means for reproducing copies of said pattern records, and means under control of said sensing means for limiting the number of copies relating to a pattern record according to the number sensed on the associated number record.

JAMES W. BRYCE.